(12) United States Patent
Goldswain et al.

(10) Patent No.: US 11,280,761 B2
(45) Date of Patent: Mar. 22, 2022

(54) MECHANICAL SEAL WITH SENSOR

(71) Applicant: JOHN CRANE UK LIMITED, Slough (GB)

(72) Inventors: Ian Martyn Goldswain, Maidenhead (GB); Joseph L. Savio, Des Plaines, IL (US); Oliver Daniel Hurtig, Frankfurt (DE)

(73) Assignee: JOHN CRANE UK LIMITED, Slough (GB)

( * ) Notice: Subject to any disclaimer, the term of this patent is extended or adjusted under 35 U.S.C. 154(b) by 0 days.

(21) Appl. No.: 16/596,122

(22) Filed: Oct. 8, 2019

(65) Prior Publication Data

US 2020/0109784 A1 Apr. 9, 2020

Related U.S. Application Data

(60) Provisional application No. 62/742,707, filed on Oct. 8, 2018, provisional application No. 62/790,969, filed on Jan. 10, 2019.

(51) Int. Cl.
*G01N 29/14* (2006.01)
*F16J 15/40* (2006.01)
(Continued)

(52) U.S. Cl.
CPC .......... *G01N 29/14* (2013.01); *F16J 15/3492* (2013.01); *F16J 15/40* (2013.01);
(Continued)

(58) Field of Classification Search
CPC . G01P 3/44; G01P 13/045; G01P 3/488; F16J 15/3492; F16J 15/40; F16J 15/3444;
(Continued)

(56) References Cited

U.S. PATENT DOCUMENTS 4,748,850 A * 6/1988 Kataoka ................ G01H 1/003
73/660
6,065,345 A * 5/2000 Holenstein ............ F04D 29/128
73/579

(Continued)

FOREIGN PATENT DOCUMENTS

CN 102313578 A * 1/2012 ........... F16J 15/3492
CN 102313578 A 1/2012
(Continued)

OTHER PUBLICATIONS

GB Search Report for Application No. 1910201.1, dated Sep. 6, 2019, 7 pages.
(Continued)

*Primary Examiner* — Marrit Eyassu
(74) *Attorney, Agent, or Firm* — Cantor Colburn LLP

(57) ABSTRACT

A system and method for monitoring a dry gas seal positionable between a stationary housing and a rotatable shaft. A plurality of sense elements may rotate in response to the rotation of the rotatable shaft and a speed sensor may sense the speed of the rotatable shaft at speeds below one thousand rotations per minute based on sensing the plurality of sense elements. An acoustic emissions sensor may sense when a first seal face and a second seal face forming a seal interface of the dry gas seal are in an operational condition relative to one another. A processor may receive output signals from the speed sensor and the acoustic emissions sensor, and may establish an operating condition of the dry gas seal based on the signal from the speed sensor when the first seal face and the second seal face reach the operational condition relative to one another.

18 Claims, 12 Drawing Sheets

(51) Int. Cl.
*G01D 5/14* (2006.01)
*G01D 5/26* (2006.01)
*F16J 15/34* (2006.01)
*G07C 3/00* (2006.01)
*G01P 3/44* (2006.01)

(52) U.S. Cl.
CPC .............. *G01D 5/142* (2013.01); *G01D 5/26* (2013.01); *G07C 3/00* (2013.01); *F16J 15/3444* (2013.01); *G01P 3/44* (2013.01)

(58) Field of Classification Search
CPC . G07C 3/00; G01D 5/142; G01D 5/26; G01N 29/14; G01M 3/24; G01M 13/005
See application file for complete search history.

(56) References Cited

U.S. PATENT DOCUMENTS

| | | | |
|---|---|---|---|
| 6,526,829 | B1 | 3/2003 | Lysen et al. |
| 6,553,837 | B1 | 4/2003 | Lysen |
| 7,097,351 | B2 | 8/2006 | Lancon et al. |
| 7,479,876 | B2 | 1/2009 | Carle et al. |
| 8,264,347 | B2 | 9/2012 | Castleman |
| 8,527,214 | B2 * | 9/2013 | Horak .................... G01N 29/14 702/34 |
| 8,540,249 | B2 | 9/2013 | Prellwitz |
| 8,578,772 | B2 | 11/2013 | Becker et al. |
| 9,297,673 | B2 | 3/2016 | Michligk |
| 9,330,560 | B2 | 5/2016 | Lawson |
| 9,453,760 | B2 | 9/2016 | Lysen |
| 9,541,128 | B2 | 1/2017 | Erskine |
| 9,835,106 | B2 | 12/2017 | Bogatzki et al. |
| 9,835,594 | B2 | 12/2017 | Yoskovitz et al. |
| 10,018,274 | B2 | 7/2018 | Khaira et al. |
| 10,132,412 | B2 | 11/2018 | Matheidas et al. |
| 10,330,647 | B2 | 6/2019 | Yoskovitz et al. |
| 10,444,118 | B2 | 10/2019 | May et al. |
| 10,738,641 | B2 | 8/2020 | Gerbi et al. |
| 2005/0016303 | A1 | 1/2005 | Jacobs et al. |
| 2006/0185445 | A1 | 8/2006 | Delcher et al. |
| 2010/0072706 | A1 * | 3/2010 | Schmitz .................. F16J 15/346 277/301 |
| 2011/0141851 | A1 | 6/2011 | Kacewicz et al. |
| 2012/0112416 | A1 | 5/2012 | Berger et al. |
| 2015/0128709 | A1 * | 5/2015 | Stewart ................. G01N 29/045 73/588 |
| 2017/0241955 | A1 | 8/2017 | Meck et al. |
| 2017/0254051 | A1 | 9/2017 | Hassanein et al. |
| 2018/0136035 | A1 | 5/2018 | Holzl |
| 2018/0328494 | A1 | 11/2018 | Rouillon |
| 2018/0372226 | A1 | 12/2018 | Hauske et al. |
| 2019/0120387 | A1 | 4/2019 | Metz |
| 2019/0323996 | A1 | 10/2019 | Yoskovitz et al. |
| 2020/0182684 | A1 | 6/2020 | Yoskovitz et al. |

FOREIGN PATENT DOCUMENTS

| | | |
|---|---|---|
| CN | 207297889 U | 5/2018 |
| DE | 102011121636 A1 | 6/2013 |
| EP | 3584472 A1 | 12/2019 |
| EP | 3625486 A1 | 3/2020 |
| FR | 2549597 A1 | 1/1985 |
| FR | 2811754 A1 | 1/2002 |
| GB | 2430034 A | 3/2007 |
| JP | H08254402 A | 10/1996 |
| JP | 2015161379 A1 | 9/2015 |
| WO | 2008089800 A1 | 7/2008 |
| WO | 2013187322 A1 | 2/2016 |
| WO | 2019076623 A1 | 4/2019 |
| WO | 2020034461 A1 | 2/2020 |
| WO | 2020076825 A1 | 4/2020 |
| WO | 2020141048 A1 | 7/2020 |

OTHER PUBLICATIONS

GB Search Report for Application No. 1910746.5, dated Sep. 12, 2019, 5 pages.
Notification of Transmittal of the International Search Report of the International Searching Authority, or the Declaration; PCT/US2019/055191; dated Jan. 20, 2020, 18 pages.
Notification of Transmittal of the International Search Report of the International Searching Authority, or the Declaration; PCT/US2019/055193; dated Jan. 20, 2020, 13 pages.
Notification of Transmittal of the International Written Opinion of the International Searching Authority, or the Declaration; PCT/US2019/055191; dated Jan. 20, 2020, 11 pages.
Notification of Transmittal of the International Written Opinion of the International Searching Authority, or the Declaration; PCT/US2019/055193; dated Jan. 20, 2020, 10 pages.
Notification of Transmittal of the International Preliminary Amendment of the International Searching Authority, or the Declaration; PCT/US2019/055191; dated Sep. 29, 2020, 10 pages.
GB Examination Report for Application No. GB1910201.1, dated Dec. 22, 2020 3 pages.
Notification of Transmittal of the International Preliminary Amendment of the International Searching Authority, or the Declaration; PCT/US2019/055191; dated Feb. 2, 2021, 22 pages.
EP Office Action for Application No. 19791156.3, dated Mar. 12, 2021, 10 pages.
Notification of Transmittal of the International Preliminary Amendment of the International Searching Authority, or the Declaration; PCT/US2019/055193; dated Apr. 22, 2021, 9 pages.
GB Office Action for Application No. 1910746.5, dated May 7, 2021, 2 pages.

* cited by examiner

MECHANICAL SEAL WITH SENSOR

CROSS-REFERENCE TO RELATED APPLICATIONS

This application claims the benefit of U.S. Provisional Application Ser. No. 62/742,707, filed Oct. 8, 2018, and U.S. Provisional Application Ser. No. 62/790,969 filed Jan. 10, 2019 which are incorporated herein by reference in its entirety.

TECHNICAL FIELD

The present disclosure relates generally to mechanical seals. More particularly, this disclosure relates to mechanical seals that include sensor and/or monitoring systems configured to monitor seal operating conditions.

BACKGROUND

Seals, such as dry gas seals, are used in a wide variety of applications including, for example, gas compressors and other rotating equipment such as gas and steam turbines, turbo expanders, centrifugal pumps, and the like. Such seals are used to seal a rotating interface between a shaft and a housing of a compressor and/or other rotating equipment. The principle of dry gas seal technology is that the sealing faces are non-contacting and a clean and dry gas is allowed to pass through the seal interface. During operation, a portion of the flow of the gas being processed may be diverted from the operating flow and filtered to remove particulate and liquid mist that may be present in the operating flow. This diverted gas flow may be further processed, for example, superheated to a temperature above its dew point, and provided to the dry gas seal as an operating fluid.

SUMMARY

The present disclosure relates generally to dry gas seals, and more particularly, devices, systems, and methods for establishing and monitoring lift off and touch down speeds of a dry gas seal to provide an assessment of seal operating conditions and/or degradation of dry gas seal faces.

In one example, a seal monitoring system for a dry gas seal assembly is disclosed. The seal monitoring system may include a dry gas seal, an acoustic emissions sensor, a speed sensor, and a processor. The dry gas seal may have a stator portion with a first seal face and a rotor portion with a second seal face, wherein the dry gas seal may be positioned between a stationary housing and a rotatable shaft, and the rotor portion may be configured to rotate with the rotatable shaft. The acoustic emissions sensor may be configured to sense when the first seal face and the second seal face are in an operational condition relative to one another and output a signal indicative of the operational condition. The speed sensor may sense the speed of the rotatable shaft at speeds below one thousand (1,000) rotations per minute (RPMs) and may be configured to output a signal indicative of a rotational speed of the rotatable shaft. The processor may be configured to receive the signal from the speed sensor and the signal from the acoustic emissions sensor, and may establish an operating condition of the dry gas seal based on the signal from the speed sensor when the first seal face and the second seal face reach the operational condition relative to one another.

Alternatively or additionally to any of the embodiments above, the operational condition of the first seal face relative to the second seal face may be a lift-off operational condition of the dry gas seal.

Alternatively or additionally to any of the embodiments above, the operational condition of the first seal face relative to the second seal face may be a touch-down operational condition of the dry gas seal.

Alternatively or additionally to any of the embodiments above, the operational condition of the first seal face relative to the second seal face may include a lift-off operational condition of the dry gas seal and a touch-down operational condition of the dry gas seal.

Alternatively or additionally to any of the embodiments above, the processor may be configured to establish the operating condition of the dry gas seal based on the signal received from the speed sensor when the dry gas seal reaches the lift-off operational condition and the signal received from the speed sensor when the dry gas seal reaches the touch-down operational condition.

Alternatively or additionally to any of the embodiments above, the speed sensor may be a Hall-effect sensor.

Alternatively or additionally to any of the embodiments above, the speed sensor may sense speeds of the rotatable shaft at speeds below five hundred (500) rotations per minute (RPMs).

Alternatively or additionally to any of the embodiments above, the speed sensor may be configured to sense speeds of the rotatable shaft at speeds below one thousand (1,000) RPMs based on sensing two or more sense elements configured to rotate with the rotatable shaft.

Alternatively or additionally to any of the embodiments above, the two or more sense elements may include slots disposed on the rotor portion of the dry gas seal.

Alternatively or additionally to any of the embodiments above, the seal monitoring system may further comprise a ring configured to rotate with the rotatable shaft, wherein the ring includes the two or more sense elements.

Alternatively or additionally to any of the embodiments above, one or more of the two or more sense elements may include an indicator element configured to allow the processor to determine a rotational direction of the rotatable shaft based on the signal output from the speed sensor.

Alternatively or additionally to any of the embodiments above, the processor may be configured to determine an axial position of the rotor portion relative to the stator portion based on the signal output from the speed sensor.

In another example, a method of operating a dry gas seal monitoring system having a dry gas seal forming a seal between a housing and a rotatable shaft is provided. The illustrative method may include determining when one of a separation of a first seal face from a second seal face of the dry gas seal and a contact of the first seal face with the second seal face occurs. The illustrative method may further include, determining a rotational speed indicative of a speed of the rotatable shaft, associating the rotational speed with an occurrence of one of the separation of the first seal face from the second seal face and the contact of the first seal face with the second seal face, and determining an operating condition of the dry gas seal based on the association of the rotational speed with an occurrence of one of the separation of the first seal face from the second seal face and the contact of the first seal face with the second seal face.

Alternatively or additionally to any of the embodiments above, determining an operating condition of the dry gas seal may include monitoring, over time, rotational speeds associated with occurrences of one of the separation of the first seal face from the second seal face and the contact of the first seal face with the second seal face.

Alternatively or additionally to any of the embodiments above, the method may further comprise establishing a first baseline speed for the separation of the first seal face from the second seal face during run-up and establishing a second baseline speed for the contact of the first seal face with the second seal face during run-down; and wherein monitoring, over time, the rotational speeds associated with occurrences of one of the separation of the first seal face from the second seal face and the contact of the first seal face with the second seal face may include one of comparing the first baseline speed with the rotational speeds associated with subsequent occurrences of the separation of the first seal face from the second seal face and comparing the second baseline speed with the rotational speeds associated with subsequent occurrences of the contact of the first seal face with the second seal face.

Alternatively or additionally to any of the embodiments above, determining an operating condition of the dry gas seal may include monitoring, over time, the rotational speeds associated with occurrences of both of the separation of the first seal face from the second seal face and the contact of the first seal face with the second seal face.

Alternatively or additionally to any of the embodiments above, the method may further comprise establishing a first baseline speed for the separation of the first seal face from the second seal face and establishing a second baseline speed for the contact of the first seal face with the second seal face; and wherein determining an operating condition of the dry gas seal may include one of comparing the first baseline speed with rotational speeds associated with occurrences of the separation of the first seal face from the second seal face and comparing the second baseline speed with the rotational speeds associated with occurrences of the contact of the first seal face with the second seal face.

Alternatively or additionally to any of the embodiments above, determining an operating condition of the dry gas seal may be based on the association of rotational speeds with occurrences of both of the separation of the first seal face from the second seal face and the contact of the first seal face with the second seal face.

Alternatively or additionally to any of the embodiments above, determining an operating condition of the dry gas seal may include one of comparing rotational speeds associated with occurrences of the separation of the first seal face from the second seal face to a lift-off speed threshold and comparing rotational speeds associated with occurrences of the contact of the first seal face with the second seal face to a touch-down threshold.

Alternatively or additionally to any of the embodiments above, determining when one of the separation of the first seal face from the second seal face and the contact of the first seal face with the second seal face occurs may be based on a signal from an acoustic emissions sensor of the dry gas seal system.

In another example, a dry gas seal is disclosed. The dry gas seal may include a rotor portion, a stator portion, a plurality of sense elements, and a speed sensor. The stator portion may have a first seal face and the rotor portion may have a second seal face, where the first seal face and the second seal face may be positioned between a rotatable shaft and a stationary housing to form a seal. The plurality of sense elements may be configured to rotate in response to the rotation of the rotatable shaft. The speed sensor may be at least partially secured relative to the stator portion and may be configured to sense the plurality of sense elements. The speed sensor may be further configured to sense a rotational speed of the rotatable shaft at speeds below one thousand (1,000) rotations per minute (RPMs) based on sensing the plurality of sense elements.

Alternatively or additionally to any of the embodiments above, the plurality of sense elements may include a plurality of slots.

Alternatively or additionally to any of the embodiments above, one or more of the plurality of slots may include a notch configured to be sensed by the speed sensor to indicate a direction of rotation of the rotatable shaft.

Alternatively or additionally to any of the embodiments above, one or more of the plurality of slots may include an axially extending taper.

Alternatively or additionally to any of the embodiments above, the axially extending taper may taper at fifty-five (55) degrees relative to a plane perpendicular to an axis of rotation of the rotatable shaft.

Alternatively or additionally to any of the embodiments above, the plurality of sense elements may be disposed on the rotor portion.

Alternatively or additionally to any of the embodiments above, the dry gas seal may further comprise a collar coupled to the rotatable shaft and configured to rotate with the rotatable shaft; and wherein the plurality of sense elements may be disposed on the collar.

Alternatively or additionally to any of the embodiments above, the speed sensor may be a Hall-effect sensor.

Alternatively or additionally to any of the embodiments above, the dry gas seal may further comprise a processor configured to receive an output from the speed sensor; and wherein the processor is configured to use the output from the speed sensor to determine an axial position of the rotor portion relative to the stator portion.

Alternatively or additionally to any of the embodiments above, the dry gas seal may further comprise an acoustic emissions sensor at least partially secured relative to the stator portion; and wherein the acoustic emissions sensor may be configured to sense a sound indicative of an operational condition of the first seal face relative to the second seal face.

In another example, a dry gas seal monitoring system is disclosed. The dry gas seal monitoring system may include a dry gas seal, a collar, a plurality of sense elements, a speed sensor, an acoustic emissions sensor, and a processor. The dry gas seal may have a first seal face and a second seal face, wherein the dry gas seal is positionable to form a seal between a stationary housing and a rotatable shaft. The collar may be configured to rotate with the rotatable shaft and the plurality of sense elements may be disposed on the collar. The speed sensor may be configured to sense the plurality of sense elements disposed on the collar as the plurality of sense elements rotate in response to rotation of the rotatable shaft. The acoustic emissions sensor may be configured to monitor an operational condition of the first seal face relative to the second seal face. The processor may be configured to receive a first signal from the speed sensor and a second signal from the acoustic emissions sensor and establish a baseline speed for the operational condition based on the first signal and the second signal.

Alternatively or additionally to any of the embodiments above, the processor may be configured to monitor changes over time in a speed sensed by the speed sensor by comparing the first signal at occurrences of the second signal to the baseline speed.

Alternatively or additionally to any of the embodiments above, the second signal from the acoustic emissions sensor may be indicative of one of a separation of the first seal face from the second seal face and a contact of the first seal face with the second seal face. Alternatively or additionally to any of the embodiments above, the speed sensor may be configured to sense the plurality of sense elements and sense speeds of the rotatable shaft at speeds below one thousand (1,000) RPMs based on sensing the plurality of sense elements.

Alternatively or additionally to any of the embodiments above, the speed sensor may be configured to sense the plurality of sense elements and sense speeds of the rotatable shaft at speeds below five hundred (500) RPMs based on sensing the plurality of sense elements.

Alternatively or additionally to any of the embodiments above, the processor may be configured to determine the direction of rotation of the rotatable shaft based on the first signal received from the speed sensor.

Alternatively or additionally to any of the embodiments above, the processor may be configured to determine an axial position of the rotatable shaft relative to the stationary housing based on the first signal received from the speed sensor.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
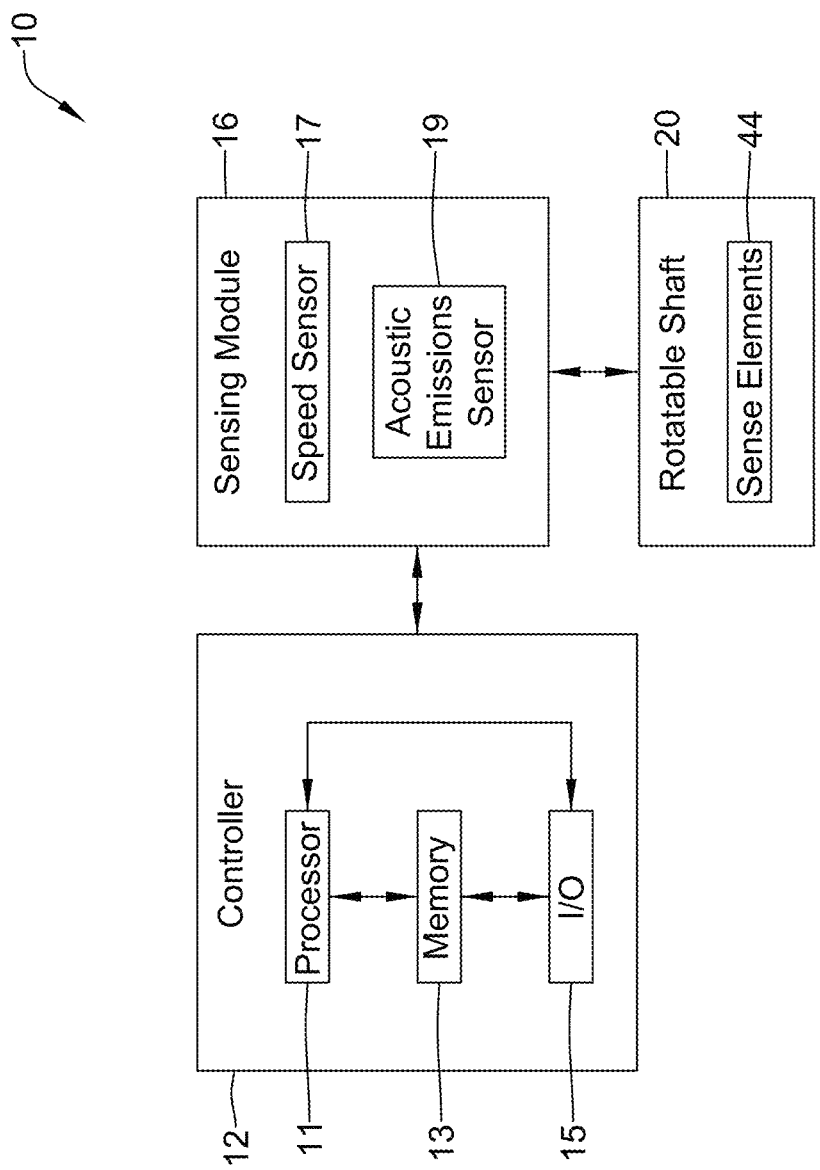
FIG. 1 is a schematic block diagram of an illustrative seal system of the present disclosure.

While the disclosure is amenable to various modifications and alternative forms, specifics thereof have been shown by way of example in the drawings and will be described in detail. It should be understood, however, that the intention is not to limit aspect of the disclosure to the particular illustrative embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in the specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the term "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, and although the term "and/or" is sometimes expressly recited herein, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used in connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the invention.

Seals are used in a wide variety of applications and/or machines including, for example, gas compressors and other rotating equipment such as gas and steam turbines, turbo expanders, centrifugal pumps and the like. Such seals are used to seal a rotating interface between a shaft and a housing of a compressor and/or other rotating equipment. Although dry gas seals are primarily discussed herein, it is contemplated that the disclosed concepts may be applied to other seals configured to seal a rotating interface between a rotating component and a stationary component.

A dry gas seal may include an inboard (IB) seal and an outboard (OB) seal, which may be known as a tandem seal configuration. In such a configuration, the IB seal may be generally pressurized to the process suction pressure, and this process suction pressure may be sufficient to lift the IB seal off statically. The OB seal may be provided as a backup to the IB seal and is designed to withstand a full pressure if the IB seal fails. If there is an issue with the seal, rubbing of the seal faces may occur and may result in abrasive wear, which is a degenerative process. As the seal wears, damage to the seal faces occurs, the lift off speed increases, and the touch down speed increases.

In some cases, seal leakage and/or outboard (OB) seal pressure may be monitored to assess a condition and seal integrity of a dry gas seal. Such monitoring, however, may only be capable of determining when a serious problem or condition with the seal occurs and urgent shut down of the associated equipment is required. As a machine may be required to be stopped, often immediately with little or no notice of an impending issue, when a serious problem or condition with the seal occurs, there is a need to be able to monitor degeneration of a dry gas seal over time to prevent or mitigate issues resulting in machine down time. By monitoring lift off and touch down speed and their variation over time, a good indication of degeneration of sealing faces can be provided, which in turn may give an indication of progressive seal failure such that the progressive seal failure can be addressed prior to actual seal failure and mitigate downtime of the machine. Typical speed monitoring systems configured to sense operating speeds of a rotatable shaft, however, are not configured to sense the relatively low speeds at which lift off and touch down occur.

FIG. 1 depicts a schematic block diagram of an illustrative seal monitoring system 10 that may facilitate establishing and/or determining seal conditions for dry gas seals and/or other suitable seal systems (e.g., operating conditions for a seal, operational conditions for a seal interface, etc.). The seal monitoring system 10 may include and/or may be configured to monitor a seal interface of a dry gas seal disposed between a rotatable shaft 20 and a stationary housing (not shown in FIG. 1). The seal monitoring system 10 may include a controller 12, a sensing module 16, and one or more sense elements 44 configured to rotate in response to rotation of the rotatable shaft 20. The sensing module 16 may be configured to sense one or more parameters related to an operation of the dry gas seal and output one or more signals to the controller 12. In some cases, the sensing module 16 may include a speed sensor 17, an acoustic emissions sensor 19, and/or one or more other suitable sensors.

In some cases, the sensing module 16 may be secured relative to and/or otherwise stationary relative to a stator portion of the dry gas seal and, in some cases, may be formed as part of the stator portion of the dry gas seal. Alternatively or in addition, at least a portion of the sensing module 16 may be secured relative to a housing component of a system to which the dry gas seal is applied and/or may be remote from the dry gas seal and/or the system to which the dry gas seal is applied.

The sensing module 16 may include the speed sensor 17 to facilitate monitoring a speed of a rotor portion of the dry gas seal and/or a speed of the rotor portion and/or the rotatable shaft 20. The speed sensor 17 may be configured to sense the rotational speed of the rotor portion and/or the rotatable shaft 20 by sensing one or more of the sense elements 44 configured to rotate in response to rotation of the rotatable shaft 20. As the one or more sense elements 44 rotate in response to rotation of the rotatable shaft 20 and rotate past a location of the speed sensor 17, the speed sensor 17 may detect the sense elements 44 and output a signal indicative of the speed of the rotor portion of the dry gas seal and/or the speed of the rotor portion and/or the rotatable shaft 20. The signal from the speed sensor 17 may be provided to the controller 12 or other component for further processing.

In some embodiments, the signal indicative of the speed of the rotor portion and/or the rotatable shaft 20 may also be indicative of an axial position of the rotor portion and/or the rotatable shaft 20. In some cases, the signal may be a pulsed signal with a pulse sequence indicating an axial position of the rotor portion and/or the rotatable shaft 20. Alternatively or in addition, the signal indicative of an axial position of the rotor portion and/or the rotatable shaft 20 may be a continuous signal indicative of a particular axial position or location of the rotor portion and/or the rotatable shaft 20.

The speed sensor 17 may be any suitable sensor type that is capable of sensing a speed of the rotatable shaft 20. For example, the speed sensor 17 may include a field sensor, an optical sensor, and/or other suitable type of sensor. Example field sensors include, but are not limited to, a magnetic field sensor, a linear variable differential transformer (LVDT), a Hall Effect sensor, and/or other suitable field sensors. In one example, the speed sensor 17 may be a Hall Effect sensor, but this is not required.

The acoustic emissions sensor 19, which may be incorporated into the sensing module 16, may be configured to output a signal (e.g., to the controller 12 or other component) indicative of an operational condition of a seal interface of the dry gas seal (e.g., an operational condition of a first seal face relative to a second seal face). In one example, as a seal face of the dry gas seal rotates with respect to at least one other seal face of the dry gas seal, the dry gas seal may emit a sound and the sound may change over time as the seal faces separate from one another (e.g., during run-up of the seal and/or the system to which the seal is applied) and/or come into contact with one another (e.g., during run-down of the seal and/or the system to which the seal is applied), and the acoustic emissions sensor 19 may be configured to sense the emitted sound and provide an indication of when a lift off (e.g., initial separation of the first seal face and the second seal face after the seal faces have been touching) occurs and/or when a touch down (e.g., initial contact between the first seal face and the second seal face as the relative rotation of the seal faces of the dry gas seal slows down) occurs. The acoustic emissions sensor 19 may output a signal indicative of its measurements to the controller 12 for processing (e.g., for processing by a processor 11 and/or other computing component).

The controller 12 may be provided as part of the seal monitoring system 10 and may be separate from the sensing module 16, as depicted in FIG. 1, or part of the sensing module 16. Alternatively, at least part of the controller 12 may be separate from the seal monitoring system 10 and may be in communication with the sensing module 16. Further, in some cases, at least part of the controller 12 may be located with and/or otherwise be incorporated in the sensing module 16.

The controller 12 may comprise, among other features, the processor 11, memory 13 (e.g. a non-transitory medium configured to store instructions for execution by the processor, data, and/or other information), and/or an input/output (I/O) 15. The I/O 15 may include one or more I/O interfaces and may receive signals from the sensing module 16 and the received signals may be sent to the memory 13 for storage and/or the processor 11 for processing. In some cases, the signal generated by the speed sensor 17 may be received by I/O 15 and sent to the processor 11. The processor 11 may use that signal to establish an operating condition of the dry gas seal and/or determine one or more other parameter values related to the dry gas seal based at least in part on the received signal. In some cases, based at least in part on the signal(s) received from the speed sensor 17, the processor 11 may be configured to determine parameter values relating to the dry gas seal including, but not limited to, a speed of the rotatable shaft 20, an axial position of the rotatable shaft 20, a lift off at the seal interface, a lift off speed, a touch down at the seal interface, a touch down speed, when maintenance is needed, an operating condition of the seal interface, and/or other suitable parameter values related to operation of the dry gas seal.

The controller 12 may determine an operational condition of the seal interface of the dry gas seal based on signals from the acoustic emissions sensor 19. In some cases, the controller 12 may associate the speed of the rotor portion of the dry gas seal or the speed of the rotatable shaft 20 at a time the signal indicating the operational condition of the seal interface occurs. The controller 12 may save the association in the memory 13, output the association via the I/O 15 to a user interface, output a control signal (e.g., to the system to which the dry gas seal is applied and/or to one or more other suitable controllable components), and/or take one or more other suitable actions. In some cases, the outputs from the controller 12 may be based on a change in speeds associated with the operational condition over time, speeds associated with the operational condition reaching and/or exceeding a threshold, and/or one or more other factors. In some cases, the operational conditions of the seal interface may be one or both of a lift-off occurrence of a first seal face separating from a second seal face during run-up of the dry gas seal and/or the system to which the dry gas seal is applied and a touch-down occurrence of the first seal face touching the second seal face during run-down of the dry gas seal and/or the system to which the dry gas seal is applied.

Figure 2:
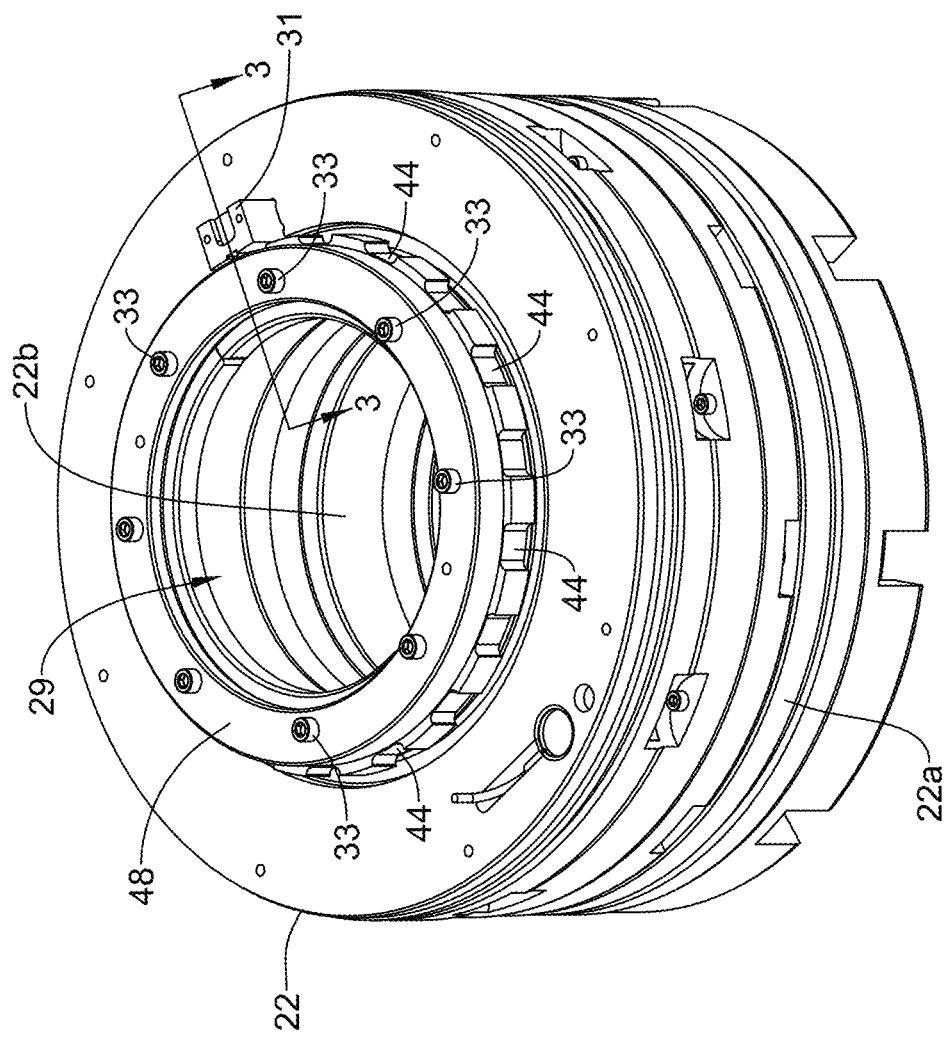
FIG. 2 is a schematic perspective view of an illustrative dry gas seal.

FIG. 2 depicts a schematic perspective view of an illustrative dry gas seal 22 (e.g., in cartridge form). The dry gas seal 22 may be configured to form a fluid tight seal between a housing and a rotating shaft. In some cases, a stator portion 22a of the dry gas seal 22 (e.g., an outer portion of the dry gas seal 22 depicted in FIG. 2) may be coupled to and/or fixed relative to a housing of a system to which the dry gas seal 22 is applied. A rotor portion 22b of the dry gas seal 22 (e.g., an inner portion of the dry gas seal 22 depicted in FIG. 2) may define an opening 29 for receiving a rotatable shaft (e.g., the rotatable shaft 20 depicted in FIG. 1) and may be coupled to the received rotatable shaft and/or otherwise configured to rotate in response to the received rotatable shaft when in use as a seal between a stationary housing and the rotatable shaft.

The dry gas seal 22 may include a collar 48 (e.g., a reluctor ring and/or other suitable collar) having one or more sense elements 44, as depicted in FIG. 2. Alternatively or in addition, the dry gas seal 22 may include one or more other suitable components (e.g., a sleeve or other suitable component) configured to include (e.g., carry, define, etc.) one or more sense elements 44. When included, the collar 48 may be configured to connect to one or both of the rotor portion 22b of the dry gas seal 22 and the rotatable shaft, such that the collar 48 may rotate in response to rotation of the rotatable shaft. In one example, as depicted in FIG. 2, the collar 48 may be coupled to and/or made integral with the rotor portion 22b via one or more screws 33 and/or other suitable connectors.

The one or more sense elements 44 may be sensed by the speed sensor 17 and signals based on the sensed sense elements 44 may be utilized to indicate an axial position of the rotor portion 22b and/or the rotatable shaft 20 and/or a rotational speed of the rotor portion 22b and/or the rotatable shaft 20, as discussed in further detail below. The one or more sense elements 44 may be configured as slots (as depicted in FIG. 2), protrusions, notches, and/or other configurations suitable for being sensed by the sensing module 16. The sense elements 44 may be made from any suitable material including, but not limited to, a metal material, a polymer material, a combination of a metal material and a polymer material, and/or other suitable material. In some cases, one or more of the sense elements 44 may be similar to one or more other sense elements 44 and/or one or more of the sense elements 44 may be different than one or more other sense elements 44. In one example of sense elements 44, the sense elements 44 may be formed into the rotor portion 22b (e.g., via the collar 48 or other suitable component), as shown in FIG. 2. In another example of the sense elements 44, the sense elements 44 may be coupled to the rotor portion 22b via a suitable coupling technique including, but not limited to, a screw, a bolt, an adhesive, a weld, a solder connection, a magnetic bond, etc.

As depicted in FIG. 2, the dry gas seal 22 may include a sensor housing 31. In some cases, the sensing module 16 may be entirely or at least partially coupled to components of the dry gas seal 22 within the sensor housing 31. Alternatively or in addition, at least part of the sensing module 16 may be coupled to other components of the dry gas seal 22 without the sensor housing 31. The sensor housing 31 may be coupled to and/or secured relative to the stator portion 22a of the dry gas seal 22, such that the components of the sensing module 16 (e.g., the speed sensor 17) may sense the sense elements 44 rotating in response to rotation of the rotatable shaft. The acoustic emissions sensor 19 may be coupled to or relative to the stator portion 22a of the dry gas seal 22 such that the acoustic emissions sensor 19 may be configured to sense operational conditions of the seal interface. When the sensor housing 31 is not included, components of the sensing module 16 may be coupled directly to the stator portion 22a of the dry gas seal 22.

Dry gas seals, such as those commonly applied to gas compressors, may include a single, tandem, or double seal arrangement. Although not required, the dry gas seal 22 may have a tandem seal assembly, as depicted in FIG. 3.

Figure 3:
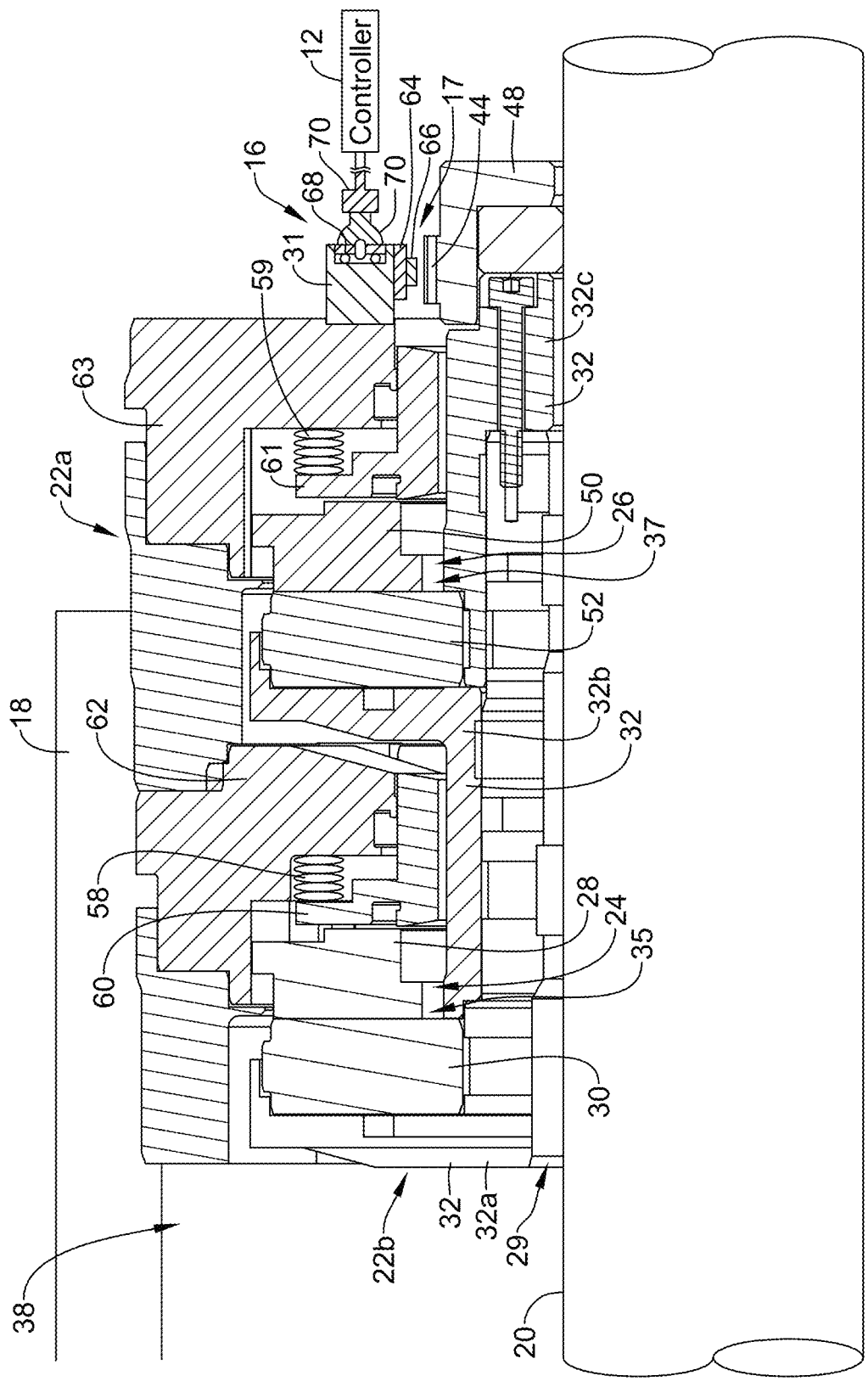
FIG. 3 is a schematic cross-sectional view of the illustrative dry gas seal of FIG. 2, taken along line 3-3, and as positioned between a housing and a rotating shaft.

FIG. 3 is a cross-section view taken along line 3-3 of the illustrative dry gas seal 22 having a tandem seal assembly shown in FIG. 2, with the rotatable shaft 20 inserted into the opening 29. During operation, gas present in the process cavity 38, may be sealed from a bearing cavity (not shown) and from the environment by two seals, a first seal 24 (e.g., an inboard (IB) seal) and a second seal 26 (e.g., an outboard (OB) seal) arranged in tandem. The components of the first seal 24 and the second seal 26 may be preassembled into a cartridge, as shown for example in FIG. 2. When positioned to create a seal between a stationary housing and the rotatable shaft 20, the cartridge may include the stator portion 22a (e.g., a stator) associated with the stationary housing 18 and the rotor portion 22b (e.g., a rotor) associated with the rotatable shaft 20.

In some cases, the rotor portion 22b may include a sleeve 32 having one or more portions that are coupled to the rotatable shaft 20 and/or otherwise configured to rotate in response to rotation of the rotatable shaft 20. The sleeve 32 may take on one or more of a variety of configurations and may extend axially beyond the second seal 26, but this is not required. In some cases, the sleeve 32 may be a single sleeve component. In other cases, the sleeve 32 may have a plurality of components or portions. For example, as depicted in FIG. 3, the sleeve 32 may have a main sleeve 32a, spacer sleeve 32b, and a locking sleeve 32c.

The first seal 24 may form a first seal interface 35 (e.g., an IB seal interface) defined between a first mating ring 30 (e.g., an IB mating ring) connected to the sleeve 32 (e.g., connected to the main sleeve 32a) disposed around the rotatable shaft 20 and having a first seal face, and a first primary ring 28 (e.g., an IB primary ring) connected to the housing 18 by the stator portion 22a and having a second seal face forming the first seal interface 35 with the first seal face of the first mating ring 30. The second seal 26 may form a second seal interface 37 (e.g., an OB seal interface) defined between a second mating ring 52 (e.g., an OB mating ring) connected to the sleeve 32 (e.g., connected to the spacer sleeve 32b and the locking sleeve 32c) disposed around the rotatable shaft 20 and having a first seal face and a second primary ring 50 (e.g., an OB primary ring) connected to the housing 18 by the stator portion 22a and having a second seal face forming the second seal interface 37 with the first seal face of the second mating ring 52.

Each of the first primary ring 28 and the second primary ring 50 may be axially movable along a direction substantially parallel to an axis of rotation of the rotatable shaft 20 such that a controlled distance may be maintained along each of the first seal 24 and the second seal 26. A spring force may be applied to the first primary ring 28 by a first spring 58 (e.g., an IB spring). In some cases, the first spring 58 may be supported between a first spring carrier 60 (e.g., an IB spring carrier) and a first retainer 62 (e.g., an IB retainer) of the stator portion 22a of the dry gas seal 22. A spring force may be applied to the second primary ring 50 by a second spring (59) e.g., an OB spring). In some cases, the second spring 59 may be supported between a second spring carrier 61 (e.g., an OB spring carrier) and a second retainer 63 (e.g., an OB retainer) of the stator portion 22a of the dry gas seal 22. Although the first retainer 62 and the second retainer 63 are depicted in FIG. 3 as separate components, the first retainer 62 and the second retainer 63 may be a single component (e.g., a single retainer) that performs the functions of the first retainer 62 and the second retainer 63.

As depicted in FIG. 3, the first mating ring 30 and the second mating ring 52 may be configured to rotate with the rotatable shaft 20. The first primary ring 28 and the second primary ring 50 may be axially adjustable within the stator portion 22a, while also being rotationally fixed relative to the stationary housing 18. The mating rings 30 and 52, and the primary rings 28 and 50, however, may be configured in different relative configurations including, but not limited to, the primary rings 28 and 50 rotating with the rotatable shaft 20 and the mating rings 30 and 52 remaining rotationally fixed relative to the primary rings 28 and 50. Further, in alternative configurations the dry gas seal 22 may have a single seal configuration or a double seal configuration, rather than the tandem seal configuration depicted in the Figures. Further, although the first seal 24 refers to the IB seal and the second seal 26 refers to the OB seal as described herein, the terms first and second are used for descriptive purposes only and the OB seal may be a first seal and the IB seal may be a second seal.

The arrangement and materials used for these seals can be optimized based on the application, for example, the operating pressures of the gas, as well as the chemical composition of the gas and/or the operating environment of the machine. The radial seals may include O-rings, other composite seal arrangements, such as advanced polymer seals surrounding seal carrier members, or other suitable types of materials for seals.

The dry gas seal 22 may further include the sensing module 16, as depicted in FIG. 3. As discussed above, in reference to FIG. 1, the sensing module 16 may be configured to sense one or more parameters related to the dry gas seal 22 and/or the rotatable shaft 20 via one or more sensors (e.g., the speed sensor 17, the acoustic emissions sensor 19 (not depicted in FIG. 3), and/or one or more other sensors or other communication components). The sensing module 16 may be coupled to and/or coupled relative to the stator portion 22a of the dry gas seal 22 and, in some cases, at least a portion of the sensing module 16 may be formed as part of the housing of the dry gas seal 22. Alternatively or in addition, it is contemplated that at least part of the sensing module 16 may be a separate component in communication with the housing of the dry gas seal and/or may be mounted at a location independent of the housing of the dry gas seal 22. In some cases, the housing 31 of the sensing module 16 may be secured relative to the housing of the dry gas seal 22.

As discussed with reference to FIG. 1, the sensing module 16 may include the speed sensor 17 to facilitate monitoring the dry gas seal 22. The speed sensor 17 may be configured to sense a rotational speed of the rotatable shaft 20 by sensing one or more sense elements 44 configured to rotate in response to rotation of the rotatable shaft 20. As the one or more sense elements 44 rotate past a location of the speed sensor 17, the speed sensor 17 may sense each sense element 44, and the sensing module 16 may generate a signal, which may be indicative of a speed of the rotatable shaft 20 and/or the rotor portion 22b of the dry gas seal 22. When connected to the controller 12, the sensing module 16 may output the signal to the controller 12.

When the speed sensor 17 includes a Hall Effect sensor, the Hall Effect sensor may be a transducer that varies its output voltage in response to a magnetic field. The Hall Effect sensor depicted in FIG. 3 may include a magnet 64 and a sensor integrated circuit (IC) 66 in communication with one or more components on a printed wiring board or printed circuit board (PCB) 68 connected to one or more connectors 70. In operation, the Hall Effect sensor may function by providing a voltage across the sensor IC 66 and applying a magnetic field to the sensor IC 66 with the magnet 64, such that a voltage output from the sensor IC 66 depends on the magnetic field. Then, as the sense elements 44 pass the speed sensor 17, the magnetic field produced by the magnet 64 may be modified and the output voltage of the sensor IC 66 may change from an output voltage when a sense element 44 is not being sensed. The output voltage from the sensor IC 66 may be provided to the PCB 68 and the signal may be output from the PCB 68 and sent through the connector(s) 70 to the controller 12 and/or other computing component. Although the Hall Effect sensor of FIG. 3 is depicted and described, other configurations of Hall Effect sensors and speed sensors 17 are contemplated.

Although the controller 12 is depicted in FIG. 3 as being spaced from the housing 31 of the sensing module 16 by the connectors 70, the controller 12 may be incorporated into the sensing module 16 and/or connected to the sensing module 16 by one or more connectors other than the connectors 70. The connectors 70 depicted in FIG. 3 are schematically depicted and, when included, may be any suitable type of electrical and/or mechanical connectors. Example electrical and/or mechanical connectors include wired connectors, wireless connectors, Bluetooth connectors, USB connectors, USB-c connectors, two-prong connectors, three-prong connectors, HDMI connectors, and/or other suitable connectors.

As depicted in FIG. 3, the speed sensor 17, a portion of the sensing module 16, and the sense elements 44 may be mounted adjacent an ambient side of the dry gas seal 22 (e.g., as opposed to the process side of the dry gas seal 22 adjacent the process cavity 38). Alternatively or in addition, at least a portion of the sensing module 16 and/or the sense elements 44 may be located at one or more other suitable locations. In one example, the sensing module 16 or at least a portion of the sensing module 16 and the sense elements 44 may be mounted or otherwise positioned at any suitable location relative to one another such that the sensing module 16 may be capable of sensing the sense elements 44 as the sense elements 44 rotate relative to rotation of the rotatable shaft 20. Further, when the sensing module 16 includes the acoustic emissions sensor 19, the sensing module 16 may be mounted or otherwise positioned at a suitable location for sensing acoustic emissions from the dry gas seal 22. The speed sensor 17 and the acoustic emissions sensor 19 may be located within the housing 31 of the sensing module 16 at a single location or within the housing 31 of the sensing module 16 at spaced apart locations, where the housing 31 may comprise a plurality of sub-components spaced from one another and configured to house components of the sensing module 16.

As discussed above, the sensing module 16 may comprise the acoustic emissions sensor 19. The acoustic emissions sensor 19 may be configured to output a signal to the processor 11 indicating an operational condition of the first seal face relative to the second seal face (e.g., an operational condition of the dry gas seal 22). For example, the acoustic emissions sensor 19 may be configured to sense sounds made by the dry gas seal 22 as the dry gas seal 22 changes operational conditions and output a signal that changes as detected sound changes. The operational conditions of the dry gas seal 22 may be a lift off of the seal faces (e.g., separation of the seal faces) of the mating rings 30, 52 and the primary rings 28, 50 during run up of the dry gas seal 22 or system to which the dry gas seal 22 is applied and/or a touchdown of the seal faces (e.g., contact between the seal faces) of the mating rings 30, 52 and the primary rings 28, 50 during run down of the dry gas seal 22 or system to which the dry gas seal 22 is applied. In some cases, the acoustic emissions sensor 19 may output a signal indicative of its measurements to the controller 12 (e.g., to the processor 11 of the controller 12 or other suitable processor) for processing.

The acoustic emissions sensor 19 may be any suitable type of acoustic emissions sensor that is capable of sensing sound from a seal interface (e.g., the seal interfaces 35 and 37). In some cases, the acoustic emissions sensor 19 may be configured to output different signal values for each seal interface when the dry gas seal 22 includes more than one seal interface, such as the first seal interface 35 and the second seal interface 37. When the acoustic emissions sensor 19 is configured to output different signal values for each seal interface, the acoustic emissions sensor 19 and/or the controller 12 may be utilized to determine the operational conditions of each seal interface 35, 37 of the dry gas seal 22.

The controller 12 may determine the operational condition of the dry gas seal 22 (e.g., the first seal face relative to a second seal face of a seal interface 35, 37) based on the signal from the acoustic emissions sensor 19. Alternatively or in addition, the acoustic emissions sensor 19 may be configured to determine the operational condition of the dry gas seal 22. In some cases, the operational condition of the rotatable shaft 20 and/or the dry gas seal 22 may be determined by comparing an acoustic emissions signal to one or more threshold values. In one example, when the operational conditions of the dry gas seal 22 to be determined are a lift off operational condition and a touch down operational condition, the acoustic emissions signal may be compared to a lift off threshold value and a touch down threshold value. If the acoustic emissions signal reaches or goes beyond the lift off threshold value, the controller 12 or the acoustic emissions sensor 19 may indicate the dry gas seal 22 has reached a lift off operational condition (e.g., a first seal face and a second seal face of at least one of the seal interfaces 35, 37 have separated). If the acoustic emission signal reaches or goes beyond the touch down threshold value, the controller 12 or the acoustic emissions sensor 19 may indicate the dry gas seal 22 has reached a touch down operational condition (e.g., a first seal face and a second seal face of at least one of the seal interfaces 35, 37 have touched).

As discussed in greater detail below, the controller 12 may be configured to associate a speed of the rotor portion 22b of the dry gas seal 22 or a speed of the rotatable shaft 20 with an occurrence of an operational condition of the dry gas seal 22. Further, the controller 12 may be configured to store the speed as associated with the occurrence of the operational condition in memory 13 and/or other suitable memory. In some cases, the controller 12 may be configured to output the speed as associated with the occurrence of the operational condition to one or more other computing systems including, but not limited to, a remote server, a user interface and/or other suitable computing system. Additionally or alternatively, the controller 12 may be configured to monitor the speeds associated with occurrences of the operational conditions of the dry gas seal 22 to determine an operating condition of the dry gas seal that may be used to monitor a health of the dry gas seal 22, diagnose conditions of the dry gas seal 22, detect anomalous seal operating conditions that may lead to failure or damage of components of the dry gas seal 22, etc.

Figure 4:
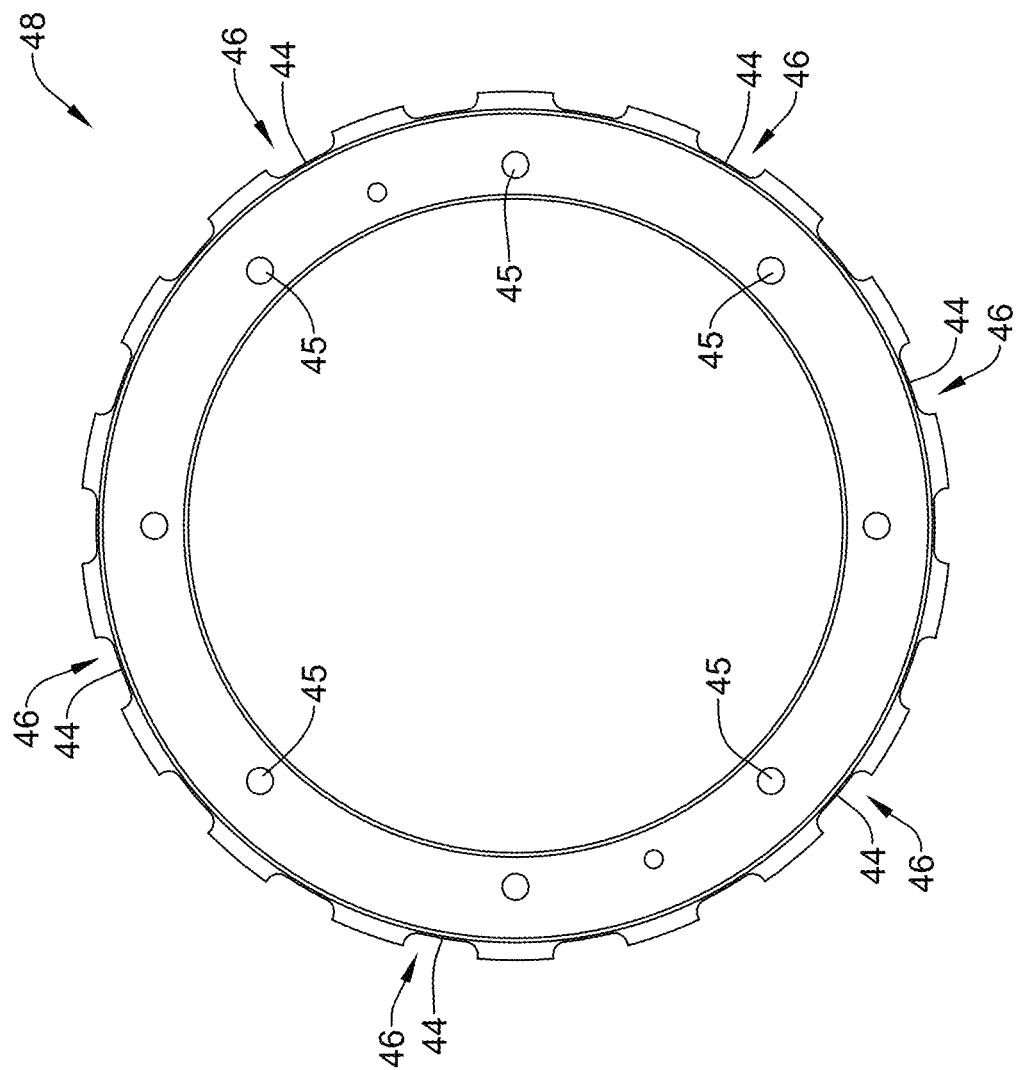
FIG. 4 is a schematic end view depicting an illustrative collar of the illustrative dry gas seal depicted in FIG. 2.

FIG. 4 depicts a schematic end view of the collar 48 having a plurality of sense elements 44 along an outer axial surface of the collar 48 and a plurality of holes 45 for receiving bolts or screws 33 (see FIG. 2). As depicted, the sense elements 44 may be slots 46 which have a consistent shape along its axial length (e.g., where the axial length is parallel to a center axis of the collar 48). However, the sense elements 44 may be protrusions and/or have one or more other suitable shapes including, but not limited to, hole configurations, circle shapes, etc. Although the sense elements 44 in FIG. 4 are depicted as having a same shape as all other sense elements 44, one or more of the sense elements 44 may have a different shape or configuration than at least one other sense element 44.

The dry gas seal 22 may include a suitable number of sense elements 44 to facilitate sensing accurate rotational speeds of the rotatable shaft 20 and/or the rotor portion 22b of the dry gas seal 22 at low speeds at which a separation or contact of seal faces forming the seal interfaces 35, 37 occurs. Such low speeds of the rotatable shaft 20 and/or the rotor portion 22b of the dry gas seal 22 may include speeds less than about one thousand (1,000) RPMs, less than about five hundred (500) RPMs, and/or other suitable similarly low speeds.

Although it may be known to sense speeds of rotatable shafts used in compressors and/or other equipment using a single sense element, such speeds to be sensed are much faster than speeds at which changes in operational conditions of first and second seal faces relative to one another occur. Thus, it has been found that in order to provide accurate speeds measurements at low speeds, a plurality of sense elements may be used to achieve a desired resolution in the speed sensed by the speed sensor 17. For example, when a single sense element is used to sense speeds from about ten thousand (10,000) RPMs to about forty thousand (40,000) RPMs or higher, which is a typical range of operating speeds of the rotatable shaft 20, the single sense element is sensed within a range from about every 0.0015 seconds and about 0.0060 seconds over the provided range of sensed speeds. Thus, to achieve a desired latency period between sensed sense elements at low speeds, more than a single sense element is needed. It has been found that two or more sense elements 44 that are sensed by the speed sensor 17 may provide a speed signal with desirable latency period between sensed sense elements 44. In one example, as depicted in FIG. 4, eighteen (18) sense elements 44 are provided. When eighteen (18) sense elements 44 are provided and speed is to be sensed at low speeds within a range from about ten (10) RPMs to about one thousand (1,000) RPMs, there may be a latency period between sensed sense elements 44 from about 0.0033 seconds to about 0.3333 seconds. Although eighteen (18) sense elements 44 are used in the example of FIG. 4, other suitable number of sense elements 44 may be utilized including, but not limited to, two (2) sense elements, four (4) sense elements, six (6) sense elements, eight (8) sense elements, ten (10) sense elements, twelve (12) sense elements, fifteen (15) sense elements, eighteen (18) sense elements, twenty five (25) sense elements, thirty (30) sense elements and/or other suitable sense elements. In some cases, a number of sense elements may be selected based, at least in part, on balancing a desire to have a shorter latency period between sensed sense elements 44 and a size (e.g., circumference, etc.) of the collar, sleeve, or other component at which the sense elements 44 may be positioned.

Figure 5:
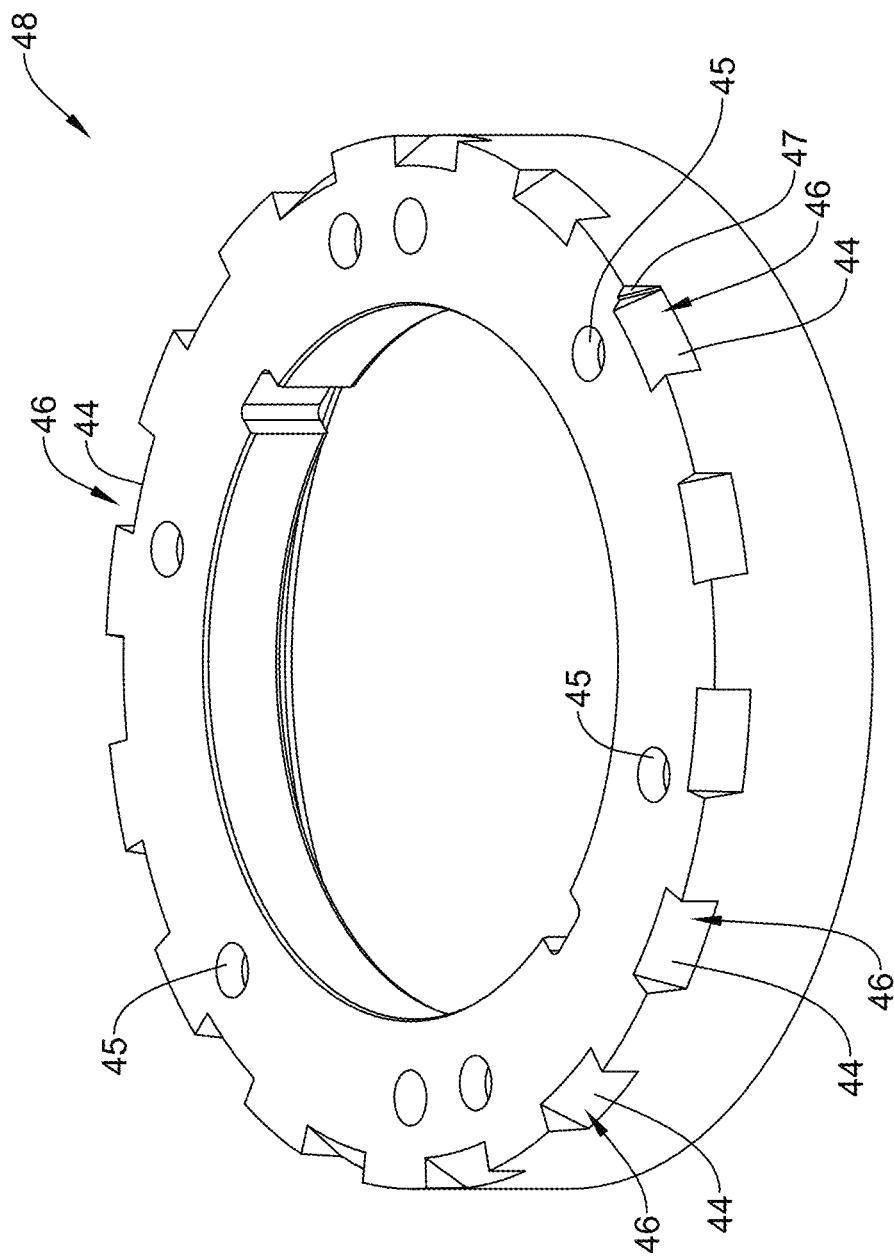
FIG. 5 is a schematic perspective view of an illustrative collar of a dry gas seal.
Figure 6:
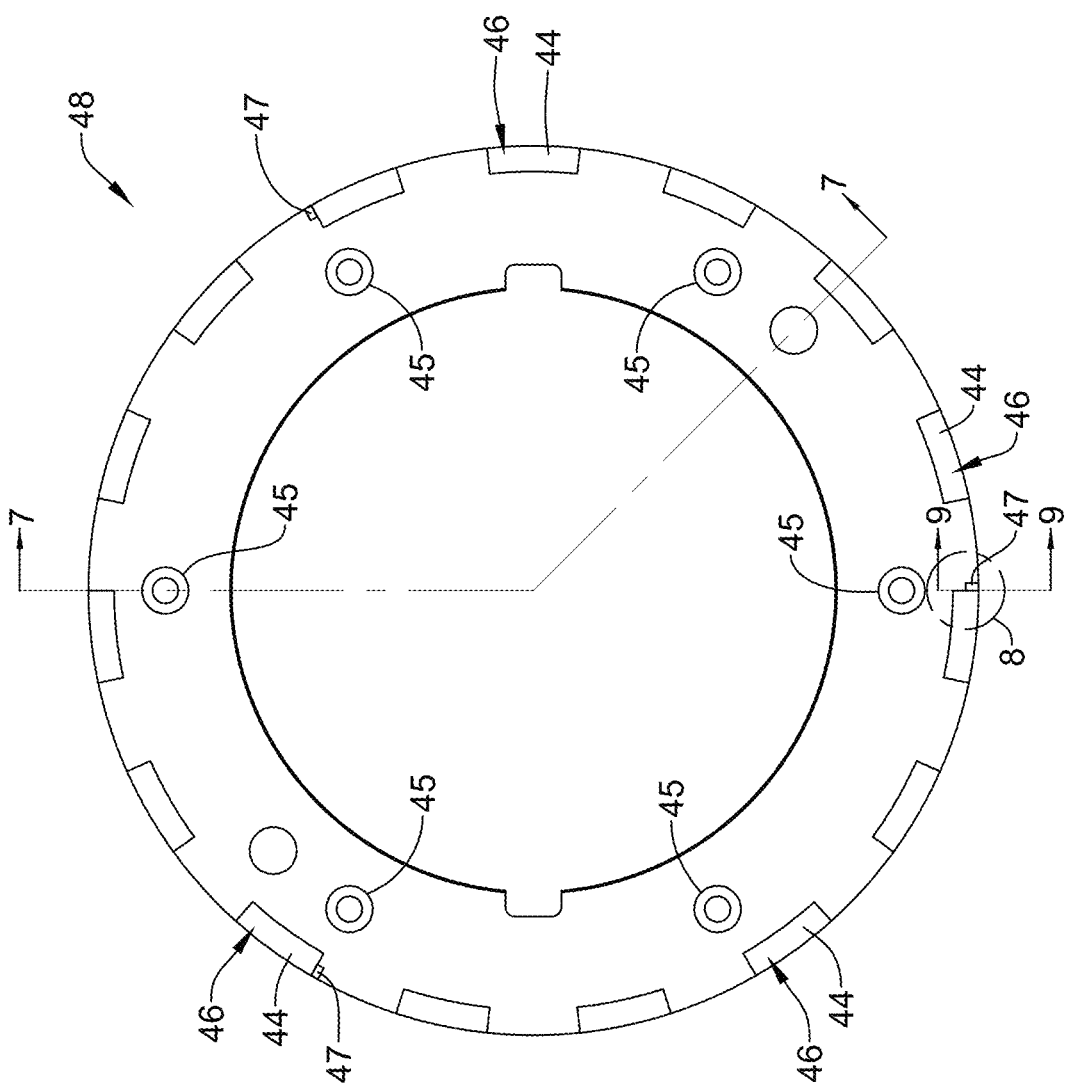
FIG. 6 is a schematic end view of the illustrative collar depicted in FIG. 5.

FIGS. 5-9 depict various schematic views of sense elements 44 disposed on an illustrative collar 48, where the sense elements 44 taper in an axial direction. FIG. 5 is a schematic perspective view of the collar 48 with sense elements 44 formed from a slot 46 and having an axially tapered cross-section. FIG. 6 is a end view of the collar 48 depicted in FIG. 5. As shown in FIGS. 5 and 6, the collar 48 may include fifteen (15) sense elements 44 formed from slots with an axially tapered cross-section, but more than fifteen (15) sense elements 44 or less than fifteen (15) sense elements may be used, as desired.

As depicted in FIG. 6, one or more of the sense elements 44 may include a notch 47 or other suitable marking that may be sensed by the speed sensor 17. In some cases, the notch 47 may be positioned radially off-centered on the sense element 44 (e.g., the notch 47 may be at one edge of the slot 46 of the sense element 44, as depicted in FIG. 6), such that the speed sensor 17 may sense the notch 47 of the sense element 44 and a resulting signal in response to sensing the sense elements 44 may be indicative to a direction of rotation (e.g., clockwise or counter clockwise) of the rotatable shaft 20 and/or the rotor portion 22b of the dry gas seal 22. For example, when the rotatable shaft 20 and/or the rotor portion 22b of the dry gas seal 22 is rotating in a first direction, the sensed notch 47 may be represented in a signal of speed sensor 17 immediately before a represented slot 46 of the sense element 44 and the sensed notch 47 may be represented in a signal of the speed sensor 17 immediately after a represented slot 46 of the sense element 44 when rotating in a second direction that is opposite the first direction.

To facilitate identifying the notch 47 within a signal from the speed sensor 17 and/or for other suitable purposes, the notch 47 may be included in less than all of the sense elements 44. For example, the notch 47 may be located in one and only one sense element 44, every other sense element 44, every third sense element 44, ever fourth sense element 44, every fifth sense element 44, every sixth sense element 44, and/or at other suitable intervals or arrangements. As depicted in FIG. 6, the notch 47 may be located in every fifth sense element 44. In some cases, notch 47 may be located in all of the sense elements 44.

Figure 7:
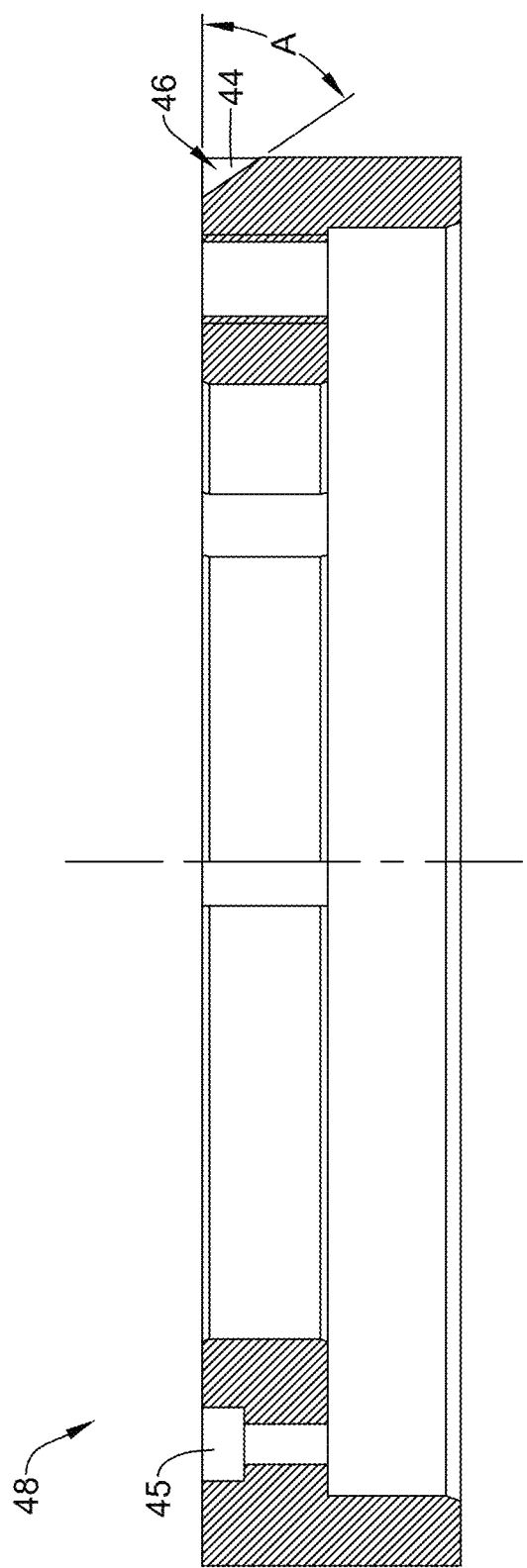
FIG. 7 is a schematic cross-sectional view of the illustrative collar depicted in FIG. 5, taken along line 7-7.

FIG. 7 is a schematic cross-sectional view of the collar 48 taken along line 7-7 in FIG. 6. As depicted in FIG. 7, the slot 46 of the sense element 44 may be axially tapered (e.g., the slot 46 may taper in an axial direction). The taper of the slot 46 may be tapered at any suitable angle A (e.g., any suitable angle A relative to a plane extending perpendicular to an axis of rotation of the rotor portion 22b, the collar 48, and/or the rotatable shaft 20). In some cases, the taper of the slot 46 may be tapered at an angle that facilitates the speed sensor outputting a different signal value (e.g., a different voltage amplitude or other suitable signal value type) based on an axial position of the sense element, which in turn may be indicative of a relative axial position of the seal faces forming the seal interfaces 35, 37, as discussed in greater detail below. Example angles for the angle A of the axially tapered slot 46 may be an angle from about five (5) degrees to about eighty five (85) degrees, from about fifteen (15) degrees to about seventy five (75) degrees, from about thirty five (35) degrees to about sixty five degrees (65), from about forty five (45) degrees to about fifty five (55) degrees, and/or at one or more other suitable angles. In one example, the angle A of the axially tapered slot 46 may be at about fifty five (55) degrees.

Figure 8:
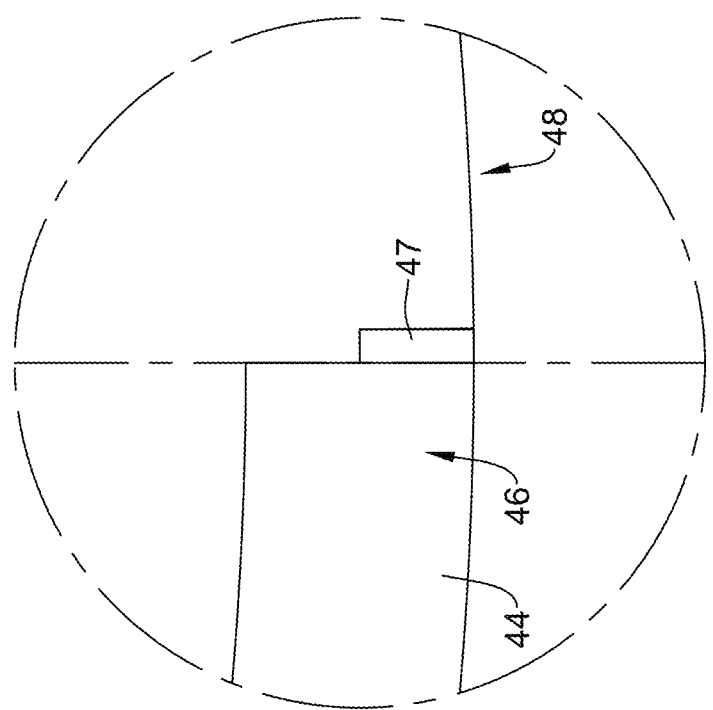
FIG. 8 is a schematic magnified view of a portion of the illustrative collar depicted in FIG. 5 that is within circle-8.

FIG. 8 schematically depicts an enlargement of a portion of the illustrative collar 48 that is within circle 8 depicted in FIG. 6. The enlarged portion of the collar 48 in FIG. 8 provides an example configuration of the notch 47. In the example depicted and as discussed above, the notch 47 of the sense element 44 may be positioned at the outer most axial and/or radial edge of the slot 46. The notch 47 may be sensed by the speed sensor 17, and due at least in part to the position of the notch 47, a direction the rotatable shaft 20 and/or the rotor portion 22b of the dry gas seal is rotating may be determined (e.g., by the controller 12) from the signal that is output by the speed sensor 17.

The notch 47 may take on any suitable 2-dimensionald and/or 3-dimensional shape. As shown in FIG. 8, from an end view the notch 47 may have a generally rectangular shape, but this is not required and the notch 47, form an end view, may take on one or more other shapes configured to facilitate detection by the speed sensor 17, facilitate determining a direction of rotation of the rotatable shaft 20 and/or the rotor portion 22b of the dry gas seal, facilitate forming the notch 47, and/or facilitate one or more other suitable function. In some cases, the notch 47 may have a different profile and/or configuration than the slots 46 of the sense element 44 to facilitate identifying sensed notches 47 in the signal from the speed sensor 17.

Figure 9:
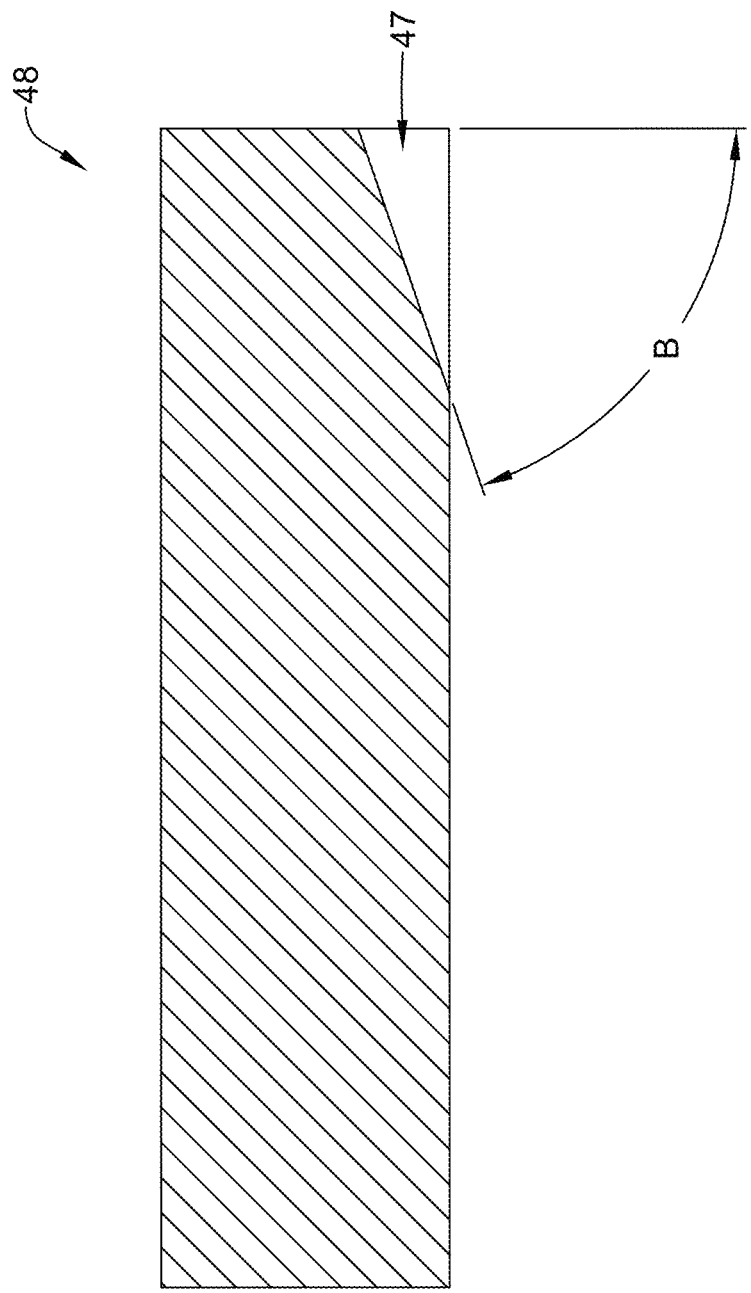
FIG. 9 is a schematic cross-sectional view of the illustrative collar depicted in FIG. 5, taken along line 9-9.

FIG. 9 is a schematic cross-sectional view of the collar 48, taken along line 9-9 of FIG. 6. As depicted in FIG. 9, the slot 46 of the sense element 44 may be axially tapered. The taper of the notch 47 may be tapered at any suitable angle B. The taper of the notch 47 may be tapered such that the tapered portion of the notch 47 may run generally parallel to the tapered portion of the slot 46 (e.g., such that angle A may be about equal to angle B), but this is not required. In some cases, the angle B of the axially tapered notch 47 may be an angle from about five (5) degrees to about eighty five (85) degrees, from about fifteen (15) degrees to about seventy five (75) degrees, from about thirty five (35) degrees to about sixty five degrees (65), from forty five (45) degrees to about fifty five (55) degrees, and/or at one or more other suitable angles. In one example, the angle B of the axially tapered slot 46 may be at about fifty five (55) degrees.

Figure 10:
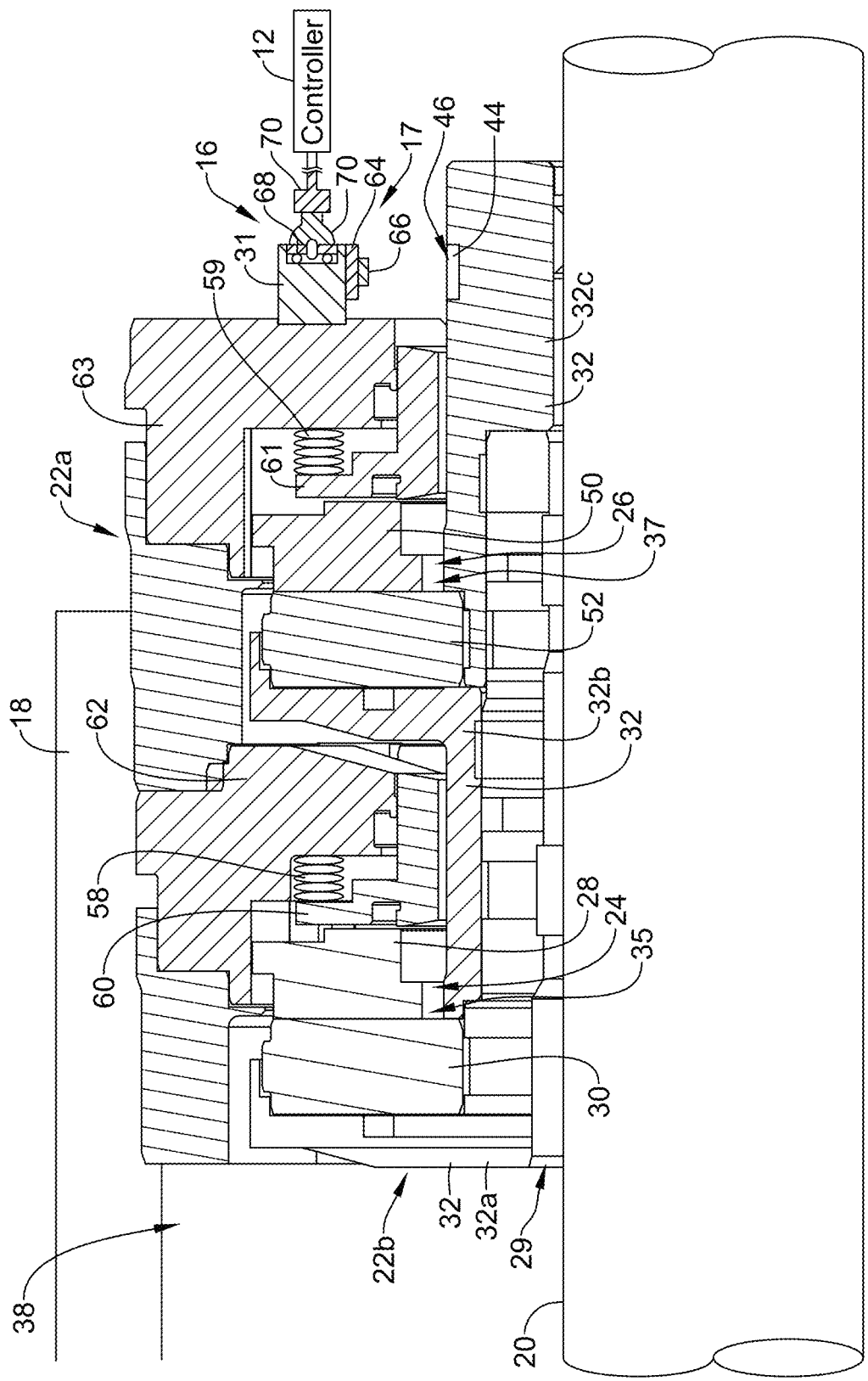
FIG. 10 is a schematic sectional view depicting a portion of an illustrative dry gas seal positioned between a housing and a rotatable shaft.

FIG. 10 depicts a cross-sectional view of the dry gas seal 22 with the rotatable shaft 20 inserted within the opening 29 of the dry gas seal 22 that is similar to the view depicted in FIG. 3, but with the sense elements 44 located on the sleeve 32 (e.g., the locking sleeve 32C, as depicted in FIG. 10, but this is not required) of the dry gas seal 22 and with the collar 48 omitted. Although the collar 48 is omitted from the dry gas seal 22 of FIG. 10, the collar 48 may be included even when the sleeve 32 includes one or more sense elements 44.

As depicted in FIG. 10, the sleeve 32 may extend outward toward an ambient space or away from the process cavity 38 such that a portion of the sleeve faces the sensing module 16 (e.g., faces the sensor IC 66). The sense elements 44 in the sleeve 32 of the dry gas seal 22 may be located at an end of the sleeve 32, similar to how the sense elements 44 are depicted in FIGS. 4-9 as being at a top end of the collar 48, or spaced from the end of the sleeve 32 as depicted in FIG. 10. Further, the sense elements 44 may be formed by the slot 46 and/or take on one or more other suitable shapes or configurations. In some cases, the sense element 44 within the sleeve 32 may take on configurations similar to or different than the configurations of other sense elements 44 described herein.

Figure 11B:
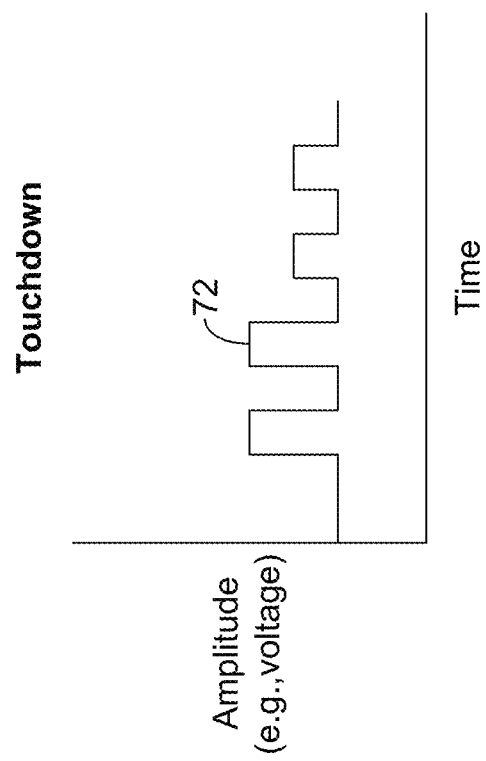
FIGS. 11A and 11B are schematic graphs depicting illustrative waveforms of a signal from a speed sensor.
Figure 11A:
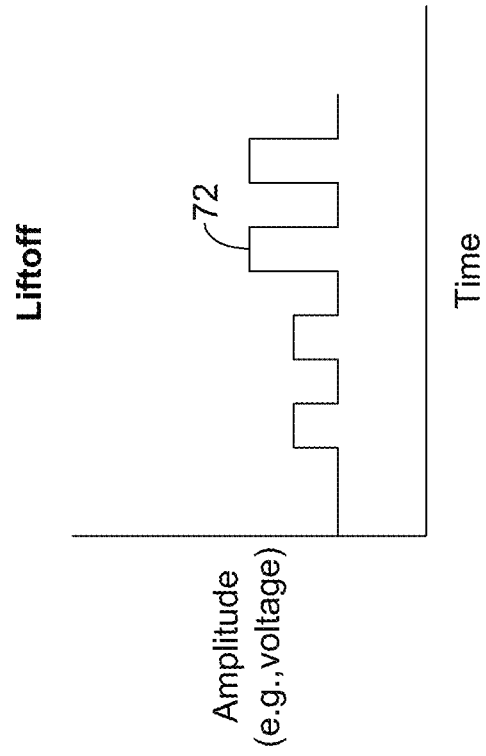

As referred to above, it may be possible to determine axial movement of the dry gas seal 22 and a lift off or touch down occurrence of a first seal face relative to a second seal face of the dry gas seal 22 based, at least in part, on a signal from the speed sensor 17. FIGS. 11A and 11B depict schematic illustrative graphs of a signal 72 output from the speed sensor 17 sensing sense elements 44 with an axial taper similar to the sense elements 44 in FIGS. 5-9, with time on the x-axis and amplitude in voltage (e.g., an amplitude of a signal from the speed sensor 17) on the y-axis, from which an axial movement of the dry gas seal 22 may be determined. FIG. 11A depicts an amplitude of the signal 72 from the speed sensor 17 which is illustrative of a touch down occurrence (e.g., an initial contact between the first seal face and the second seal face during run down of a system) and FIG. 11B depicts an amplitude of the signal 72 from the speed sensor 17 which is illustrative of a lift off occurrence (e.g., an initial separation of the first seal face and the second seal face during run up of a system). It is contemplated that while still capable of being used for the functional purposes discussed herein, graphs of the signal 72 may take on one or more other forms based on particular configurations and/or arrangements of the sense elements 44

Turning to FIG. 11A, the first two increases in the amplitude of the signal 72 are indicative of positions of sensed sense elements 44 when there is a separation between seal faces of a seal interface with the rotor portion 22b of the dry gas assembly pushed downward such that the speed sensor 17 senses a top of the tapered slot 46, which is a portion of the sense element 44 that is farther away from the speed sensor 17 than the bottom of the tapered slot 46. The second two increases in the amplitude of the signal 72 are indicative of positions of sensed sense elements 44 after touch down occurs and the rotor portion 22b is pushed upward such that a seal face of the rotor portion 22b is in contact with a seal face of the stator portion 22a and the speed sensor 17 senses a bottom of the tapered slot 46, which is a portion of the sense element 44 closer to the speed sensor 17 than the top of the tapered slot 46. Based, at least in part, on such a signal, the controller 12 may be able to determine when a touch down occurs and associate the speed of the rotor portion 22b and/or the rotatable shaft 20 with the touch down occurrence for determining and/or monitoring an operating condition of the dry gas seal 22.

Turning to FIG. 11B, the first two increases in the amplitude of the signal 72 are indicative of positions of sensed sense elements 44 when there is a contact between seal faces of a seal interface, with the rotor portion 22b of the dry gas assembly pushed upward such that the speed sensor 17 senses a bottom of the tapered slot 46, which is a portion of the sense element that is closer to the speed sensor 17 than the top of the tapered slot 46. The second two increases in the amplitude of the signal 72 are indicative of positions of sensed sense elements 44 after lift off occurs and the rotor portion 22b is pushed downward such that a seal face of the rotor portion 22b is spaced from a seal face of the stator portion 22a and the speed sensor senses a top of the tapered slot 46, which is a portion of the sense element 44 closer to the speed sensor 17 than the top of the tapered slot 46. Based, at least in part, on such a signal, the controller may be able to determine when a lift off occurs and associate the speed of the rotor portion 22b and/or the rotatable shaft 20 with the lift off occurrence for determining and/or monitoring an operating condition of the dry gas seal 22.

Although the example of determining an axial position of the dry gas seal 22 and/or an operational condition of a first seal face relative to a second seal based at least in part on an output signal from the speed sensor 17 is provided using the tapered slots 46 depicted in FIGS. 5-9, an axial position of the dry gas seal 22, or portions thereof, may be determined using any suitable slot configuration that varies vertically and results in the speed sensor outputting different signals (e.g., signals with different amplitudes, different pulse widths, and/or other suitable differences) as portions of the dry gas seal 22 move axially. In one example, an axial position of the dry gas seal 22, or portions thereof, may be determined using a slot 46 for a sense element that has a curved cross-section, a circular cross-section and/or other suitable cross section.

Figure 12:
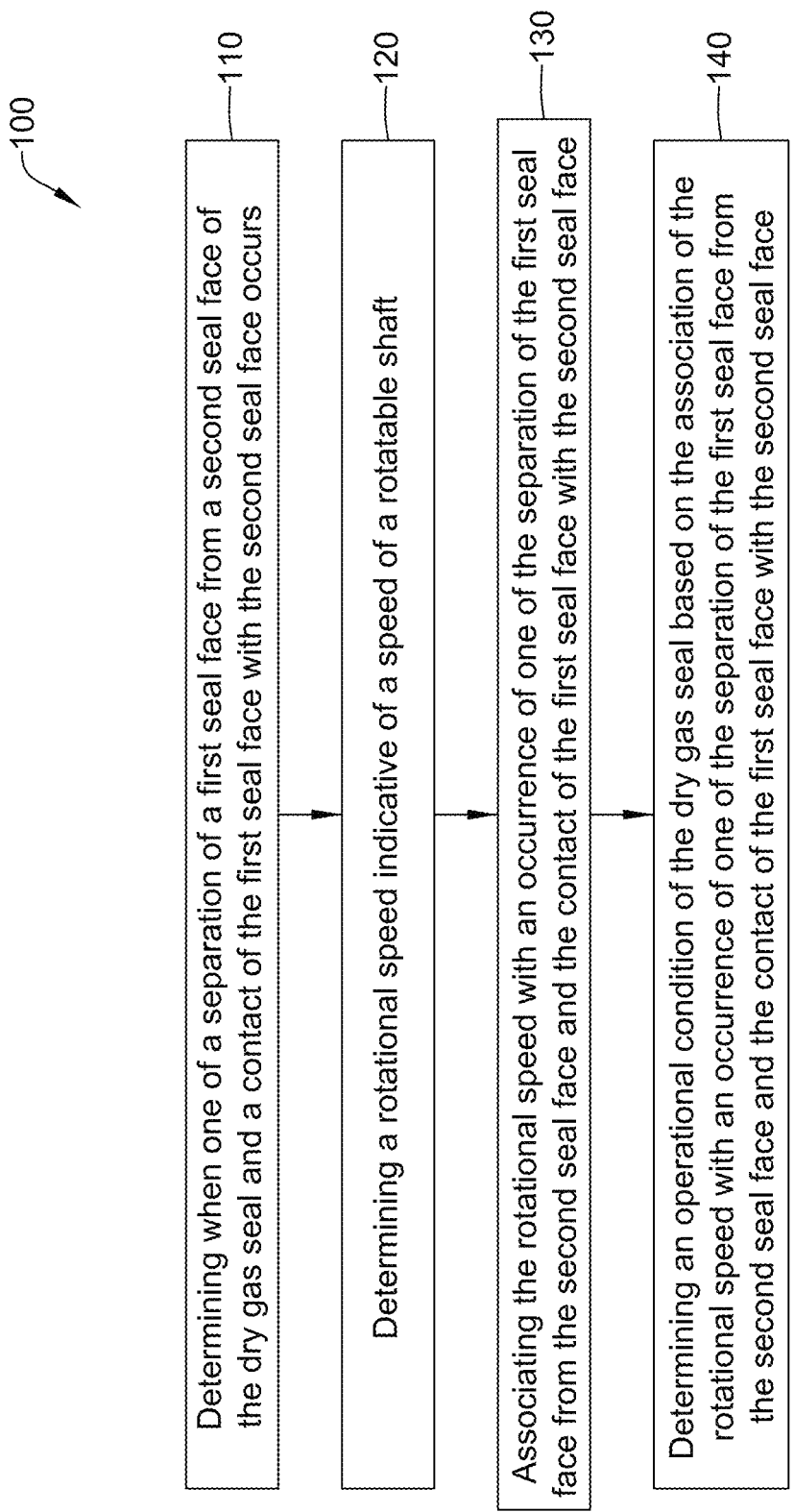
FIG. 12 is a schematic flow diagram depicting an illustrative method of operating a dry gas seal monitoring system.

FIG. 12 illustrates an example method 100 of operating a dry gas seal monitoring system having a dry gas seal (e.g., the dry gas seal 22 and/or other suitable dry gas seal) forming a seal between a housing (e.g., the housing 18 and/or other suitable housing) and a rotatable shaft (e.g., the rotatable shaft 20 and/or other suitable rotatable shaft). The method 100 may include determining 110 when one of a separation of a first seal face from a second seal face of the dry gas seal and a contact of the first seal face with the second seal face occurs (e.g., determining an occurrence of an operational condition) and determining 120 a rotational speed indicative of a speed of the rotatable shaft. Determining an occurrence of one of the separation of the first seal face from the second seal face and the contact of the first seal face with the second seal face may be based, at least in part, on a signal of an acoustic emissions sensor (e.g., the acoustic emissions sensor 19 and/or other suitable acoustic emissions sensor), a signal from speed sensor (e.g., the speed sensor 17 and/or other suitable speed sensor), and/or in one or more other suitable signals or parameters. Determining a rotational speed indicative of a speed of the rotatable shaft may be determined based, at least in part, on a signal from the speed sensor and/or other suitable signals or parameters.

The method 100 may further include associating 130 the rotational speed that is determined when there is an occurrence of the operational condition with the respective occurrence of one of the separation of the first seal face from the second seal face and the contact of the first seal face with the second seal face, and determining 140 an operational condition of the dry gas seal based, at least in part, on the association of the rotational speed with the occurrence of one of or both of the separation of the first seal face from the second seal face and the contact of the first seal face with the second seal face. Further, in instances when the dry gas seal includes multiple seal interfaces, the operational condition of the dry gas seal may be determined based, at least in part, on an association of the rotational speed with the occurrence of one of or both of the separation of the first seal face from the second seal face and the contact of the first seal face with the second seal face for one or more of the multiple seal interfaces.

The determined operating condition of the dry gas seal may be any suitable operating condition of the dry gas seal. For example, the determined operating condition may be an indication that the dry gas seal is healthy, unhealthy, needs real-time maintenance, will need maintenance in N units of time, will need maintenance in N cycles of use, needs to be shut down, and/or other suitable conditions relating to the operation of the dry gas seal. Such determining of the operating condition of the dry gas seal may facilitate planning for maintenance and/or down time of a machine or system using the dry gas seal, which will mitigate unexpected shutdown of systems and/or machines.

In some cases, determining an operating condition of the dry gas seal may include monitoring, over time, rotational speeds associated with occurrences of one of or both of the separation of the first seal face from the second seal face and the contact of the first seal face with the second seal face. To facilitate monitoring speeds over time, a first baseline speed for the separation of the first seal face from the second seal face during run-up may be established and a second baseline speed for the contact of the first seal face with the second seal face during run down may be established. Then, once the baselines values are established the first baseline speed may be compared with the rotational speeds associated with occurrences of the separation of the first seal face from the second seal face and the second baseline speed may be compared with the rotational speeds associated with occurrences of the contact of the first seal face with the second seal face to determine the operating condition of the dry gas seal.

Although baselines may be established and utilized, other methods of monitoring and/or determining operating conditions of the dry gas seal are contemplated. In some cases, monitoring and/or determining operating conditions of the dry gas seal may include comparing speeds at current occurrences of an operational condition of one seal face relative to another seal face to a predetermined threshold value, a rolling average of speeds associated with the N previous occurrences of an operational condition of one seal face relative to another seal face, comparing a delta change in speed between a speed at a current occurrence of an operational condition of one seal face relative to another seal face and a speed at one or more previous occurrences of an operational condition of one seal face relative to another seal face to a threshold value, and/or compare the speeds at occurrences of an operational condition of one seal face relative to another seal face to one or more other suitable value.

As discussed above, occurrences of the separation of the first seal face from the second seal face and/or the contact of the first seal face with the seal face at seal interfaces (e.g., the first seal interface 35, the second seal interface 37, and/or other suitable seal interfaces) of the dry gas seal occur at low speeds (e.g., speeds of less than one thousand (1,000) RPMs) relative to operating speeds of a system (e.g., compressor or other suitable system) to which the dry gas seal may be applied (e.g., speeds within a range from about ten thousand (10,000) RPMs to about forty thousand (40,000) RPMs or greater). With existing speed sensors configured to sense speeds of the rotatable shaft at operating speeds, it is not possible to obtain an accurate speed of the rotatable shaft and/or a rotor portion (e.g., the rotor portion 22b or other suitable rotor portion) of the dry gas seal at the low speeds at which seal faces of a seal interface initially separate from one another (e.g., lift off) or initially come into contact with one another (e.g., touch down), which typically occur at speeds less than about one thousand (1,000) RPMs, and more typically at speeds less than about five hundred (500) RPMs. As such, existing speed sensors used for sensing operating speeds of rotatable shafts cannot be used to accurately determine speeds that are to be associated with lift off or touch down operational conditions of the seal faces in a manner that allows for adequate monitoring of operating conditions of dry gas seals. The improved dry gas seal monitoring systems and methods discussed herein, however, may facilitate accurately determining speeds to be associated with lift off or touch down operational conditions of the seal faces and thus, facilitate accurately determining an operating condition of the dry gas seal based on the associated speeds in a manner that allows for adequate monitoring of operating conditions of dry gas seals.

It should be understood that this disclosure is, in many respects, only illustrative. The various individual elements discussed above may be arranged or configured in any combination thereof without exceeding the scope of the disclosure. Changes may be made in details, particularly in matters of shape, size, and arrangement of steps without exceeding the scope of the disclosure. The disclosure's scope is, of course, defined in the language in which the appended claims are expressed.

What is claimed is:

1. A seal monitoring system for a dry gas seal assembly, comprising:
    a dry gas seal having a stator portion with a first seal face and a rotor portion with a second seal face, the dry gas seal is configured to be positioned between a stationary housing and a rotatable shaft with the rotor portion configured to rotate with the rotatable shaft;
    an acoustic emissions sensor configured to sense when the first seal face and the second seal face are in an operational condition relative to one another and output a signal indicative of the operational condition; and
    a speed sensor sensing speed of the rotatable shaft at speeds below one thousand (1,000) rotations per minute (RPMs), the speed sensor configured to output a signal indicative of a rotational speed of the rotatable shaft;
    a processor configured to receive the signal from the speed sensor and the signal from the acoustic emissions sensor; and
    wherein the processor is configured to establish an operating condition of the dry gas seal based on the signal received from the speed sensor when the first seal face and the second seal face reach the operational condition relative to one another;
    wherein the operational condition of the first seal face relative to the second seal face is a lift-off operational condition of the dry gas seal.

2. The seal monitoring system of claim 1, wherein the speed sensor is a Hall-effect sensor.

3. The seal monitoring system of claim 1, wherein the speed sensor senses speeds of the rotatable shaft at speeds below five hundred (500) rotations per minute (RPMs).

4. The seal monitoring system of claim 1, wherein the speed sensor is configured to sense speeds of the rotatable shaft at speeds below one thousand (1,000) RPMs based on sensing two or more sense elements configured to rotate with the rotatable shaft.

5. The seal monitoring system of claim 4, wherein the two or more sense elements include slots disposed on the rotor portion of the dry gas seal.

6. The seal monitoring system of claim 4, further comprising:
a ring configured to rotate with the rotatable shaft, wherein the ring includes the two or more sense elements.

7. The seal monitoring system of claim 4, wherein one or more of the two or more sense elements includes an indicator element configured to allow the processor to determine a rotational direction of the rotatable shaft based on the signal output from the speed sensor.

8. The seal monitoring system of claim 4, wherein the processor is configured to determine an axial position of the rotor portion relative to the stator portion based on the signal output from the speed sensor.

9. A seal monitoring system for a dry gas seal assembly, comprising:
a dry gas seal having a stator portion with a first seal face and a rotor portion with a second seal face, the dry gas seal is configured to be positioned between a stationary housing and a rotatable shaft with the rotor portion configured to rotate with the rotatable shaft;
an acoustic emissions sensor configured to sense when the first seal face and the second seal face are in an operational condition relative to one another and output a signal indicative of the operational condition; and
a speed sensor sensing speed of the rotatable shaft at speeds below one thousand (1,000) rotations per minute (RPMs), the speed sensor configured to output a signal indicative of a rotational speed of the rotatable shaft;
a processor configured to receive the signal from the speed sensor and the signal from the acoustic emissions sensor; and
wherein the processor is configured to establish an operating condition of the dry gas seal based on the signal received from the speed sensor when the first seal face and the second seal face reach the operational condition relative to one another;
wherein the operational condition of the first seal face relative to the second seal face is a touch-down operational condition of the dry gas seal.

10. A seal monitoring system for a dry gas seal assembly, comprising:
a dry gas seal having a stator portion with a first seal face and a rotor portion with a second seal face, the dry gas seal is configured to be positioned between a stationary housing and a rotatable shaft with the rotor portion configured to rotate with the rotatable shaft;
an acoustic emissions sensor configured to sense when the first seal face and the second seal face are in an operational condition relative to one another and output a signal indicative of the operational condition; and
a speed sensor sensing speed of the rotatable shaft at speeds below one thousand (1,000) rotations per minute (RPMs), the speed sensor configured to output a signal indicative of a rotational speed of the rotatable shaft;
a processor configured to receive the signal from the speed sensor and the signal from the acoustic emissions sensor; and
wherein the processor is configured to establish an operating condition of the dry gas seal based on the signal received from the speed sensor when the first seal face and the second seal face reach the operational condition relative to one another;
wherein the operational condition of the first seal face relative to the second seal face includes a lift-off operational condition of the dry gas seal and a touch-down operational condition of the dry gas seal.

11. The seal monitoring system of claim 10, wherein the processor is configured to establish the operating condition of the dry gas seal based on the signal received from the speed sensor when the dry gas seal reaches the lift-off operational condition and the signal received from the speed sensor when the dry gas seal reaches the touch-down operational condition.

12. A method of operating a dry gas seal monitoring system having a dry gas seal forming a seal between a housing and a rotatable shaft, the method comprising:
determining when one of a separation of a first seal face from a second seal face of the dry gas seal and a contact of the first seal face with the second seal face occurs;
determining a rotational speed indicative of a speed of the rotatable shaft at speeds below one thousand (1,000) rotations per minute (RPMs);
associating the rotational speed with an occurrence of one of the separation of the first seal face from the second seal face and the contact of the first seal face with the second seal face; and
determining an operating condition of the dry gas seal based on the association of the rotational speed with an occurrence of one of the separation of the first seal face from the second seal face and the contact of the first seal face with the second seal face;
wherein determining when one of the separation of the first seal face from the second seal face and the contact of the first seal face with the second seal face occurs is based on a signal from an acoustic emissions sensor of the dry gas seal system.

13. The method of claim 12, wherein determining an operating condition of the dry gas seal includes monitoring, over time, rotational speeds associated with occurrences of one of the separation of the first seal face from the second seal face and the contact of the first seal face with the second seal face.

14. The method of claim 13, further comprising:
establishing a first baseline speed for the separation of the first seal face from the second seal face during run-up and establishing a second baseline speed for the contact of the first seal face with the second seal face during run-down; and
wherein monitoring, over time, the rotational speeds associated with occurrences of one of the separation of the first seal face from the second seal face and the contact of the first seal face with the second seal face includes one of comparing the first baseline speed with the rotational speeds associated with subsequent occurrences of the separation of the first seal face from the second seal face and comparing the second baseline speed with the rotational speeds associated with subsequent occurrences of the contact of the first seal face with the second seal face.

15. The method of claim 12, wherein determining an operating condition of the dry gas seal includes monitoring, over time, the rotational speeds associated with occurrences of both of the separation of the first seal face from the second seal face and the contact of the first seal face with the second seal face.

16. The method of claim 12, further comprising:
- establishing a first baseline speed for the separation of the first seal face from the second seal face and establishing a second baseline speed for the contact of the first seal face with the second seal face; and
- wherein determining an operating condition of the dry gas seal includes one of comparing the first baseline speed with rotational speeds associated with occurrences of the separation of the first seal face from the second seal face and comparing the second baseline speed with the rotational speeds associated with occurrences of the contact of the first seal face with the second seal face.

17. The method of claim 12, wherein determining an operating condition of the dry gas seal is based on the association of rotational speeds with occurrences of both of the separation of the first seal face from the second seal face and the contact of the first seal face with the second seal face.

18. The method of claim 12, wherein determining an operating condition of the dry gas seal includes one of comparing rotational speeds associated with occurrences of the separation of the first seal face from the second seal face to a lift-off speed threshold and comparing rotational speeds associated with occurrences of the contact of the first seal face with the second seal face to a touch-down threshold.

\* \* \* \* \*